United States Patent [19]

Williams

[11] Patent Number: 4,877,189

[45] Date of Patent: Oct. 31, 1989

[54] IRRIGATION SYSTEM

[76] Inventor: Christopher G. Williams, P.O. Box 1372, Spokane, Wash. 99211-1372

[21] Appl. No.: 50,965

[22] Filed: May 18, 1987

[51] Int. Cl.$^4$ ............................................. A01G 25/09
[52] U.S. Cl. ................................ 239/749; 239/740
[58] Field of Search ............... 239/738, 743, 735, 744, 239/746, 737, 723, 733, 734, 740, 748, 749, 739

[56] References Cited

U.S. PATENT DOCUMENTS

| | | | |
|---|---|---|---|
| 1,966,783 | 7/1934 | Balaam | 239/742 X |
| 2,711,615 | 6/1955 | Boice | 239/729 |
| 3,255,969 | 6/1966 | Stafford | 239/735 |
| 3,281,080 | 10/1966 | Hogg | 239/733 |
| 3,381,893 | 5/1968 | Smith et al. | 239/733 X |
| 3,647,139 | 3/1972 | DeLong et al. | 239/728 |
| 3,901,442 | 8/1975 | Chapman | 239/728 X |
| 4,192,335 | 3/1980 | Standal | 239/733 X |
| 4,295,607 | 10/1981 | Noble | 239/740 X |
| 4,522,338 | 6/1985 | Williams | 239/734 X |

FOREIGN PATENT DOCUMENTS

| | | | |
|---|---|---|---|
| 561667 | 10/1923 | France | 239/738 |
| 48608 | 8/1986 | U.S.S.R. | 239/732 |

Primary Examiner—Andres Kashnikow
Assistant Examiner—Kevin P. Weldon

[57] ABSTRACT

A fully automated land irrigation system to irrigate regular and irregular shapes of land. The system includes an expanse of water delivery pipe moved laterally while irrigating adjacent to a stationary row of spaced access valves supplied by a water main. The invention includes a new connection apparatus for hydraulically connecting the traveling delivery pipe along the row of stationary access valves. A swing arm is pivotably mounted to one end of the delivery pipe and a valve coupler is mounted to the opposite free swinging swing arm end. Valve connection is made and the delivery pipe irrigates traveling the same distance found between successive access valves. The coupler is then disconnected from the valve and the free swing arm end, with coupler, is ground pivoted to the next valve where connection is again made. Delivery pipe travel results in rotation of the swing arm about the valve connection. This rotation feature also enables the swing arm and the water delivery pipe to be pivoted about a valve as an anchor to a similar position on the opposite side of the water main. The new connector also provides inherent geographic positioning for the traveling delivery pipe. The invention is enhanced by elongated rotatable discharge booms mounted atop the transport carts of the traveling delivery pipe and selectively rotated.

28 Claims, 26 Drawing Sheets

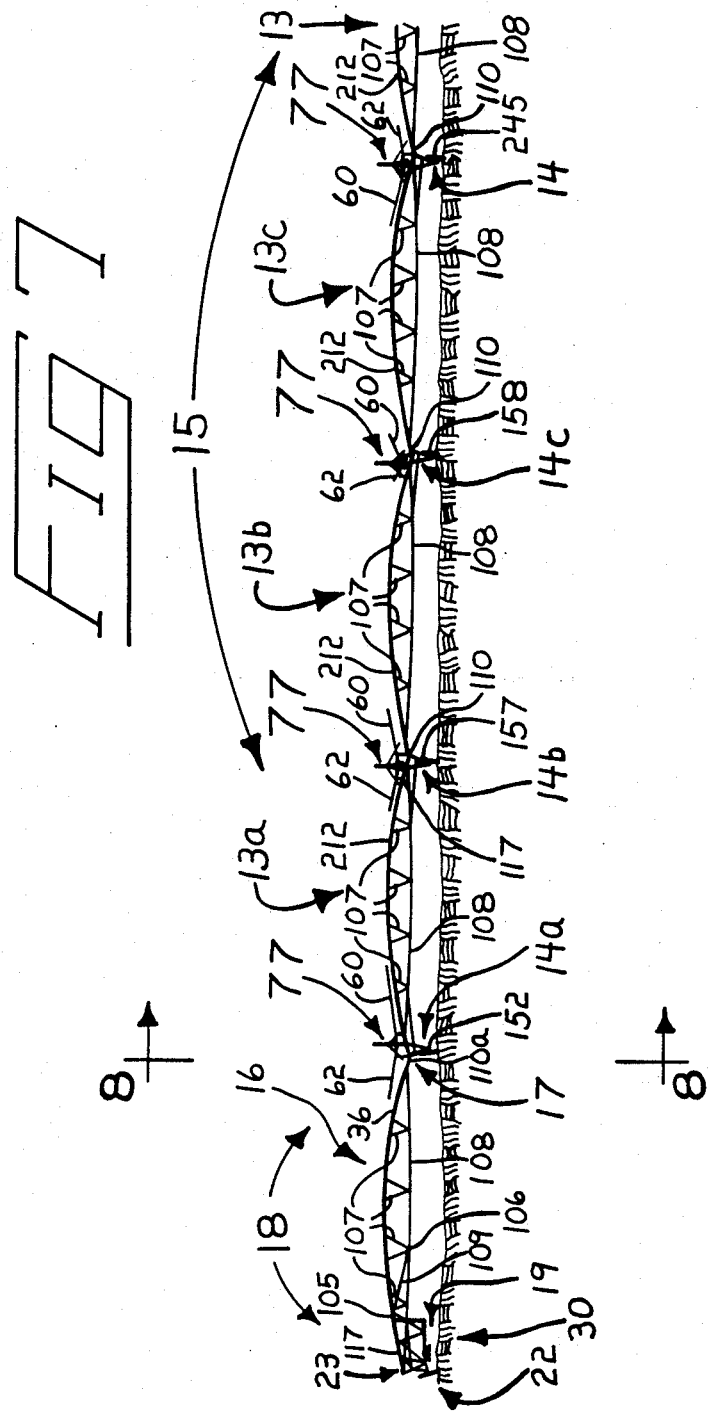

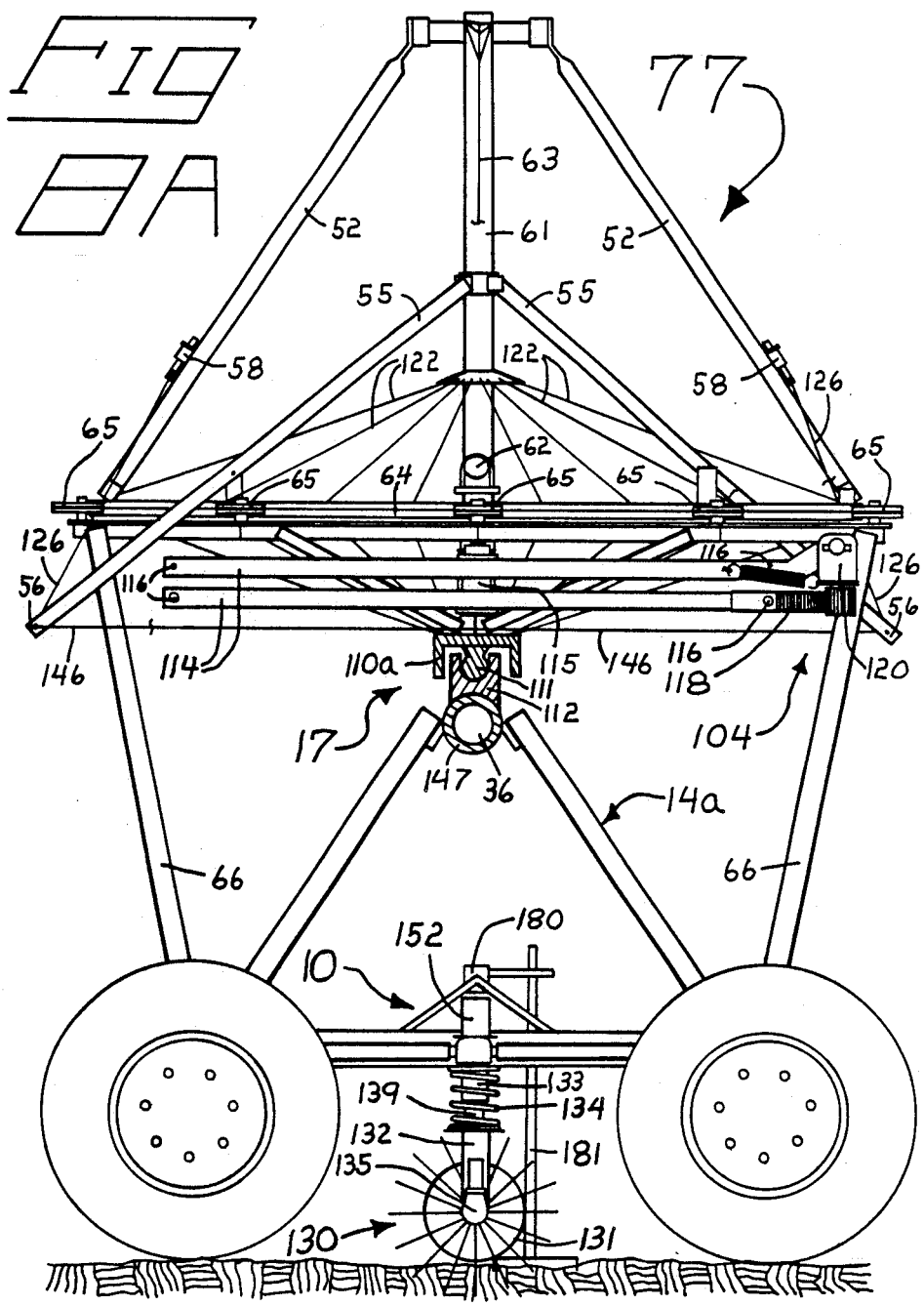

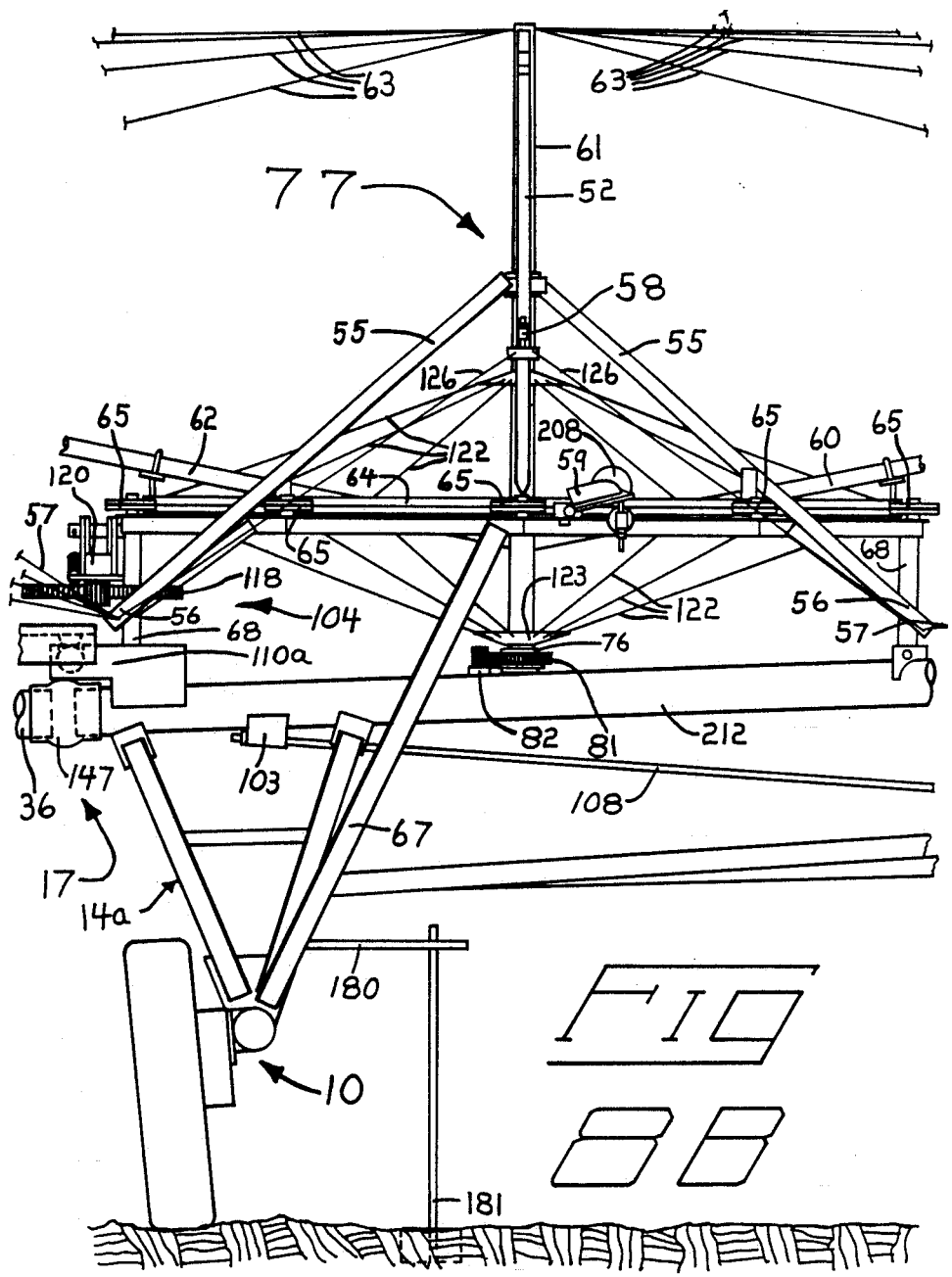

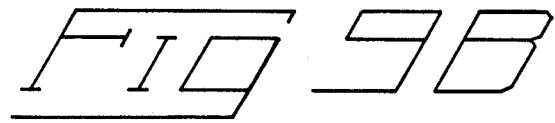
FIG 9B
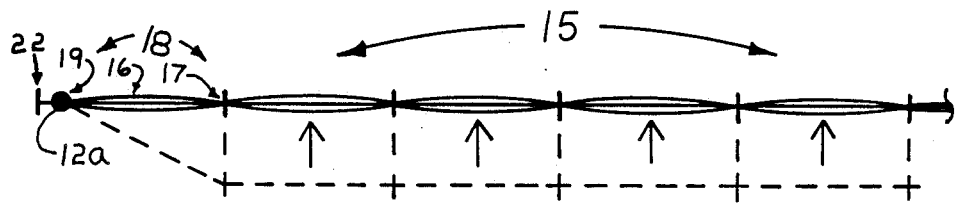

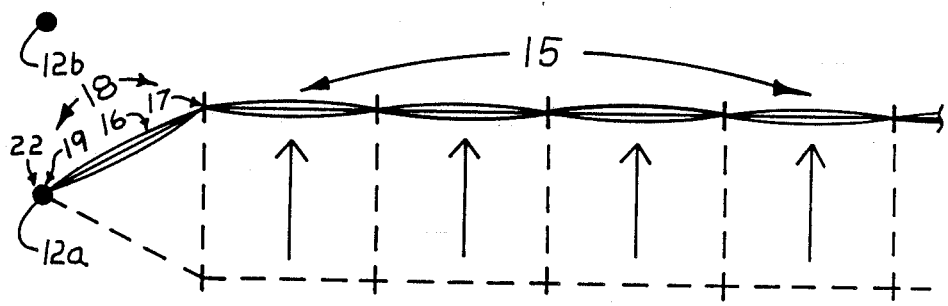
FIG 9C

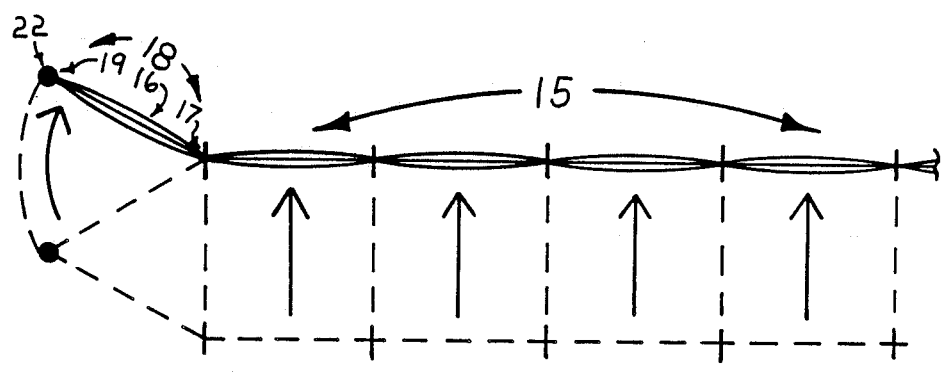

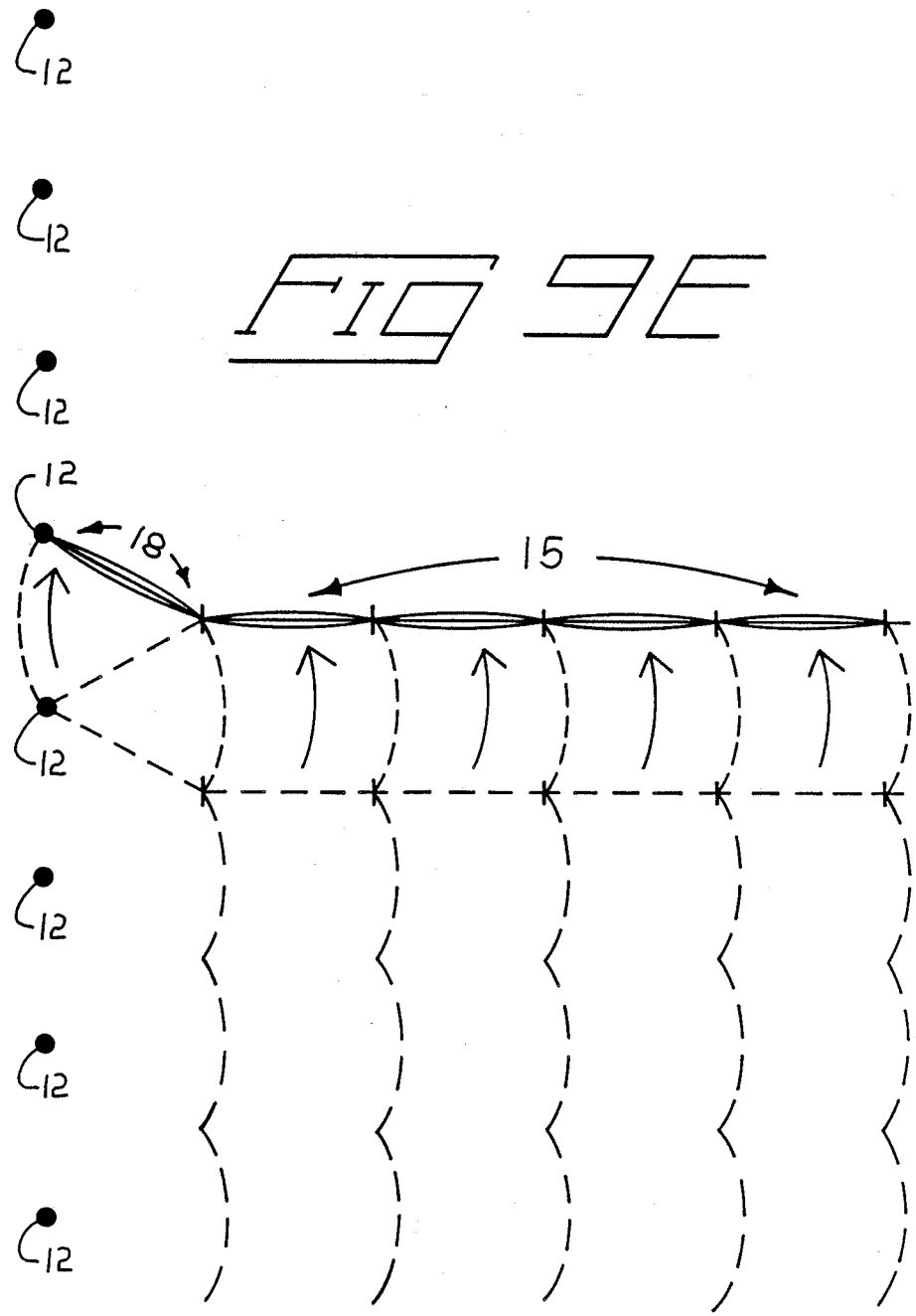

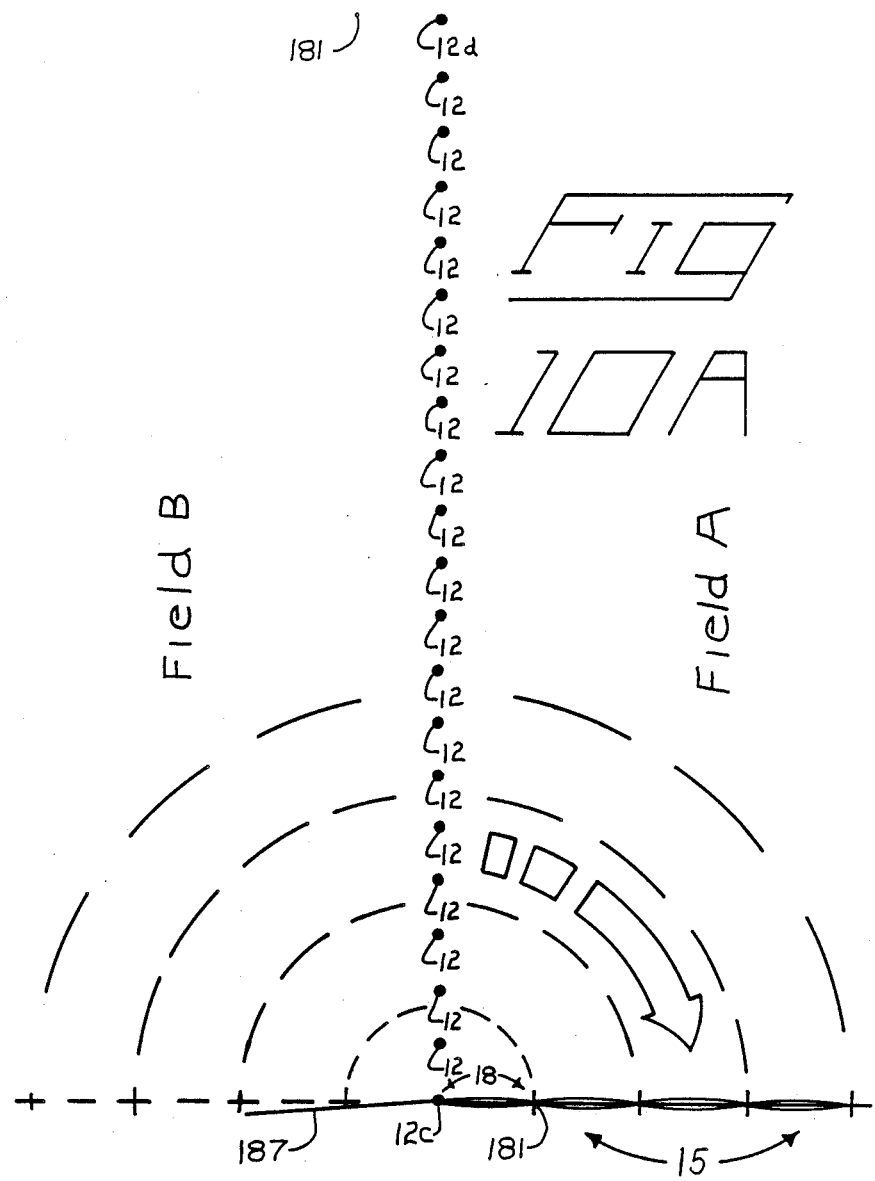

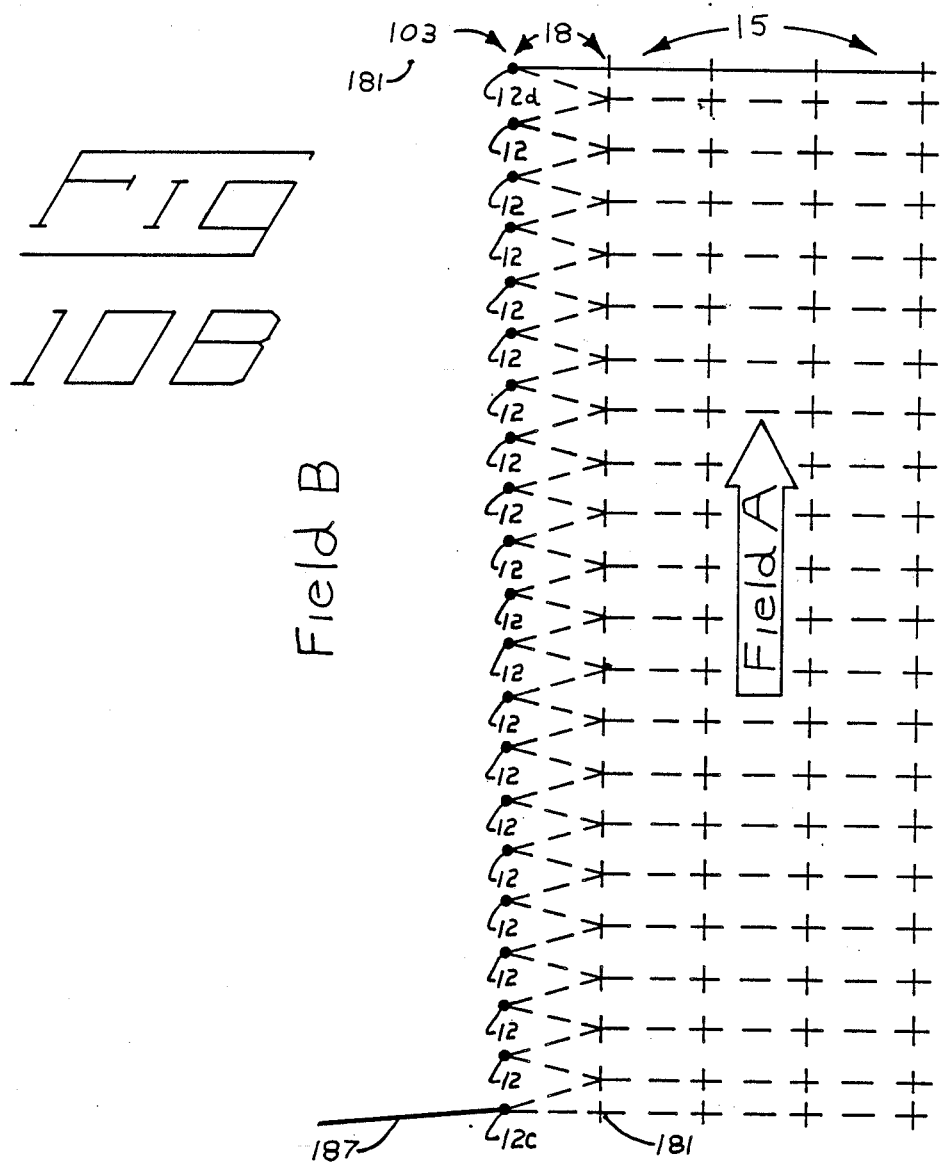

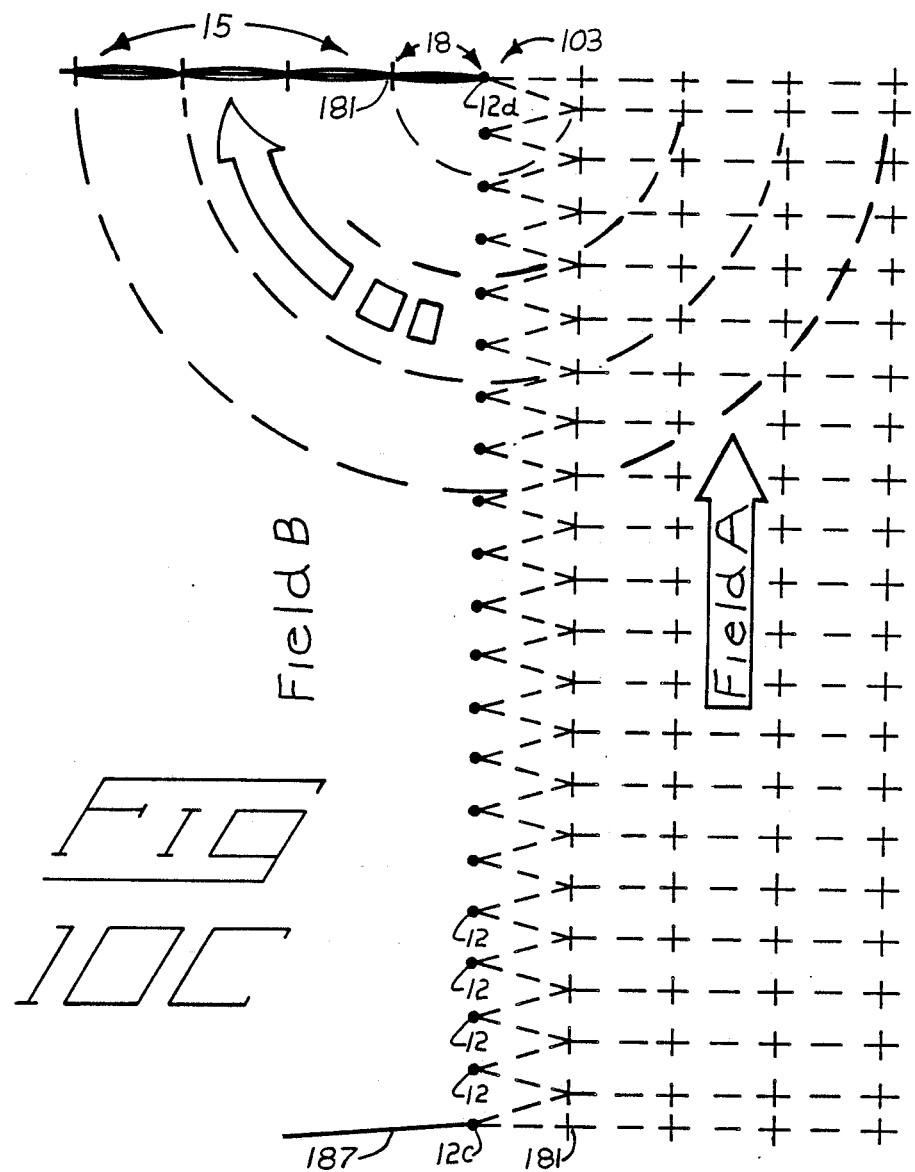

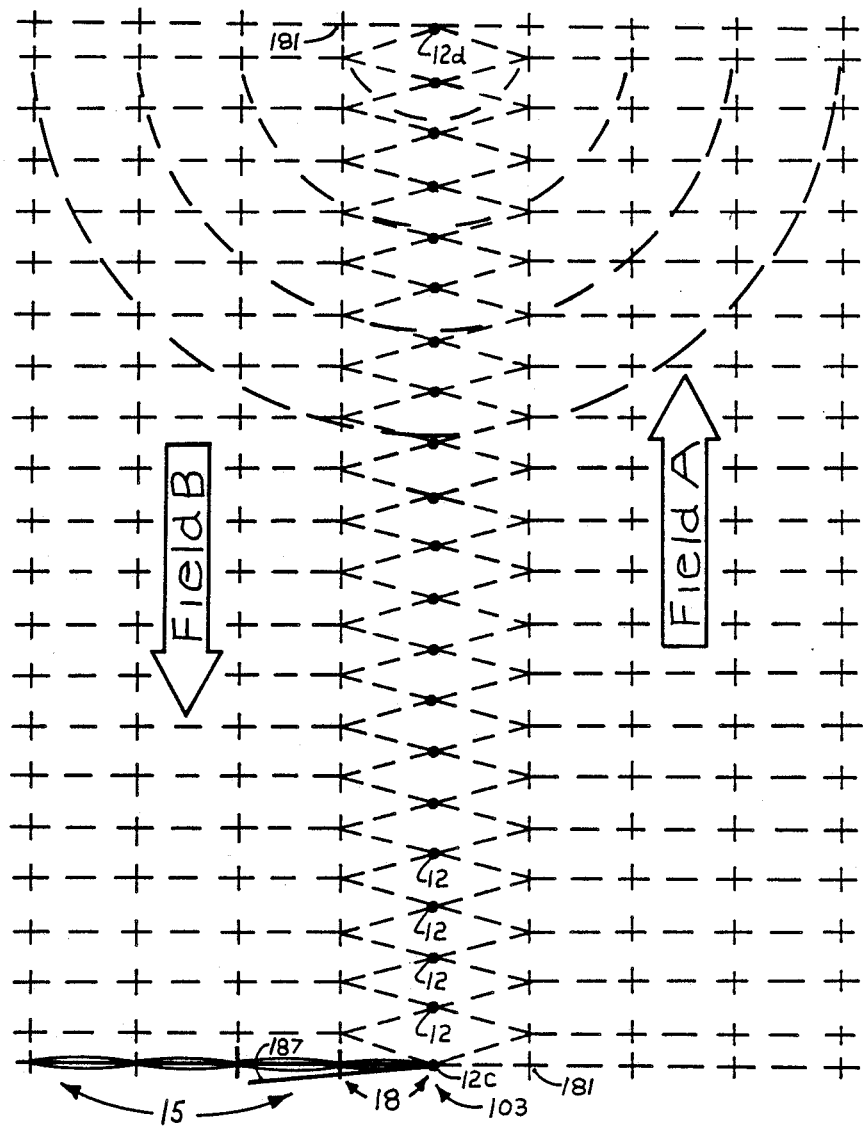

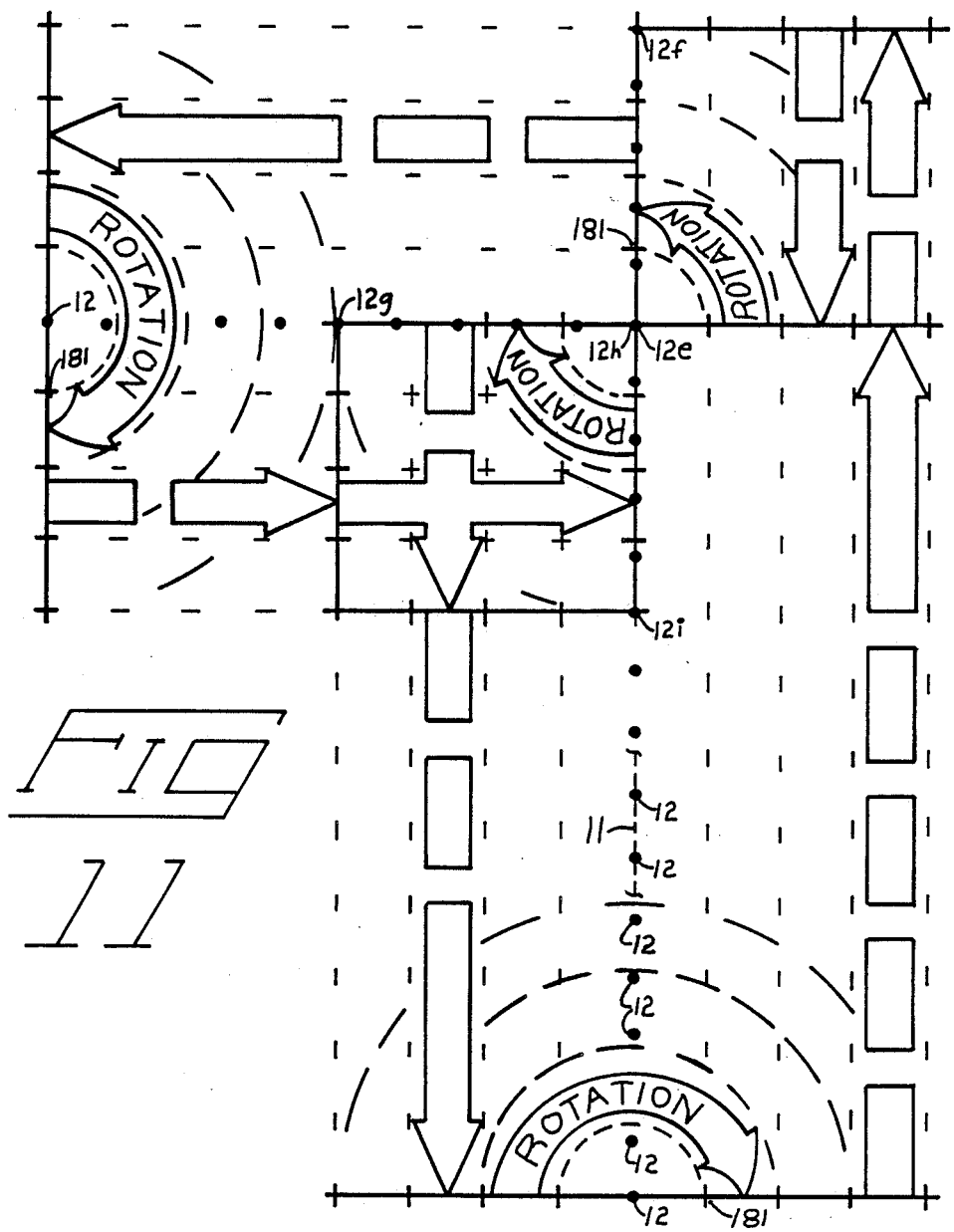

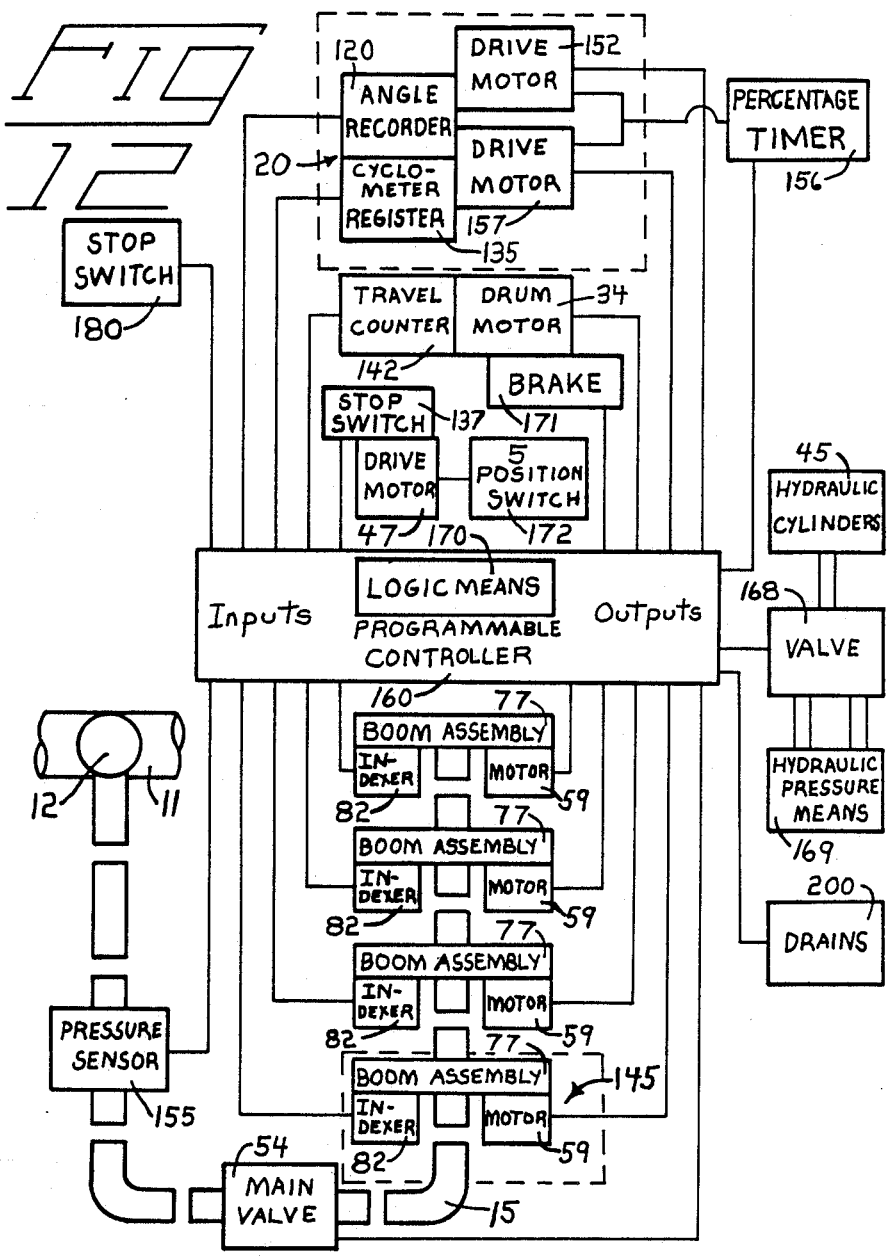

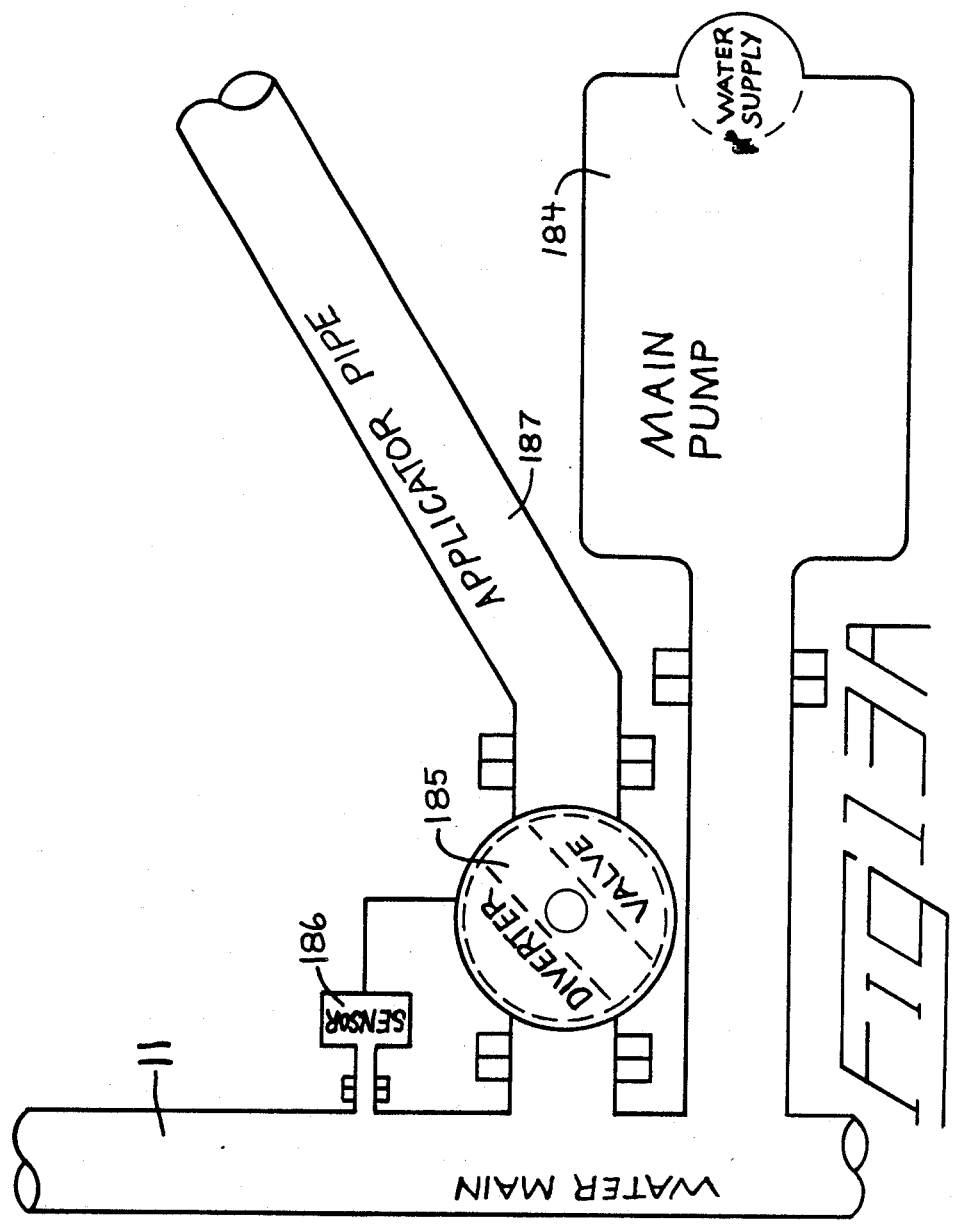

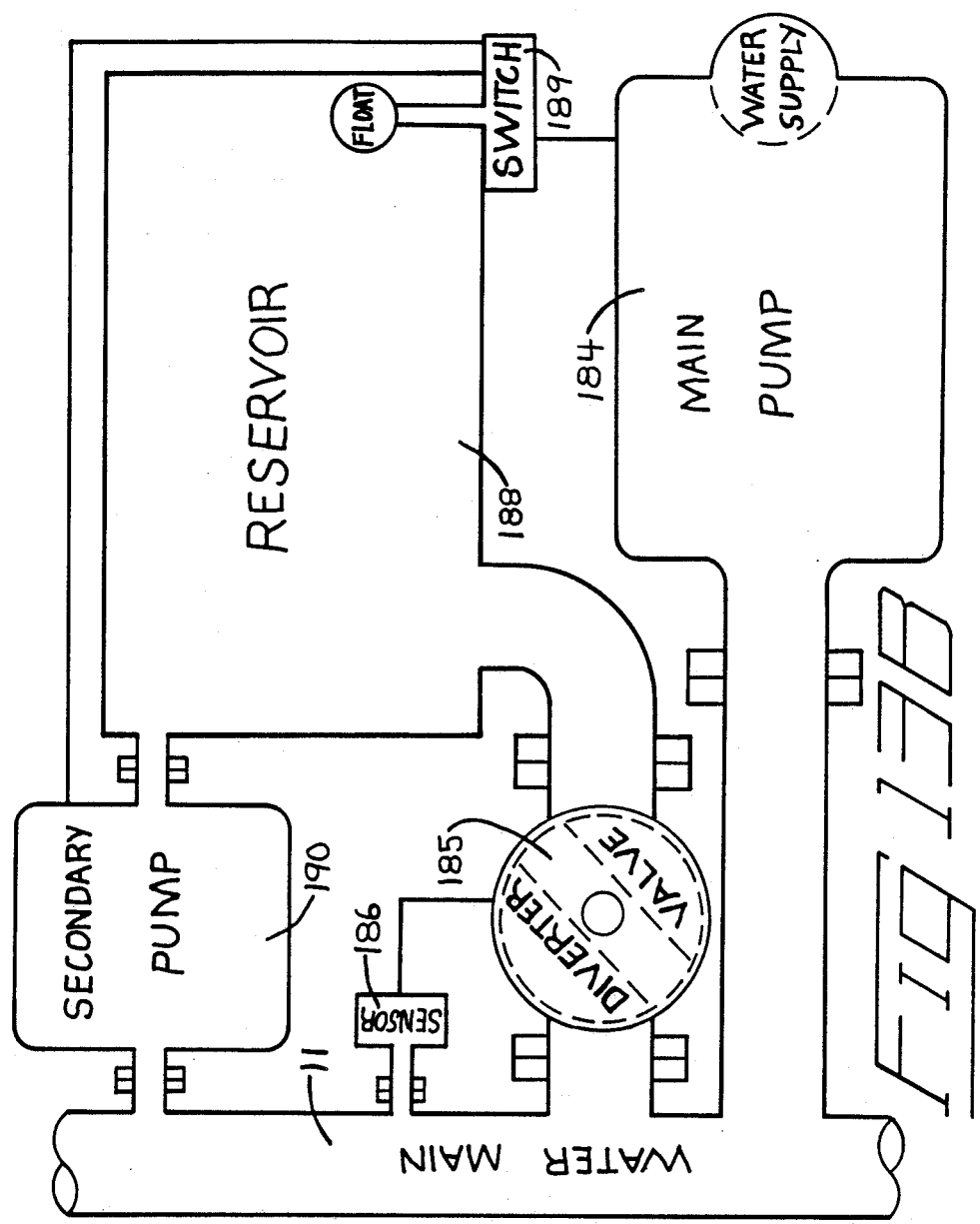

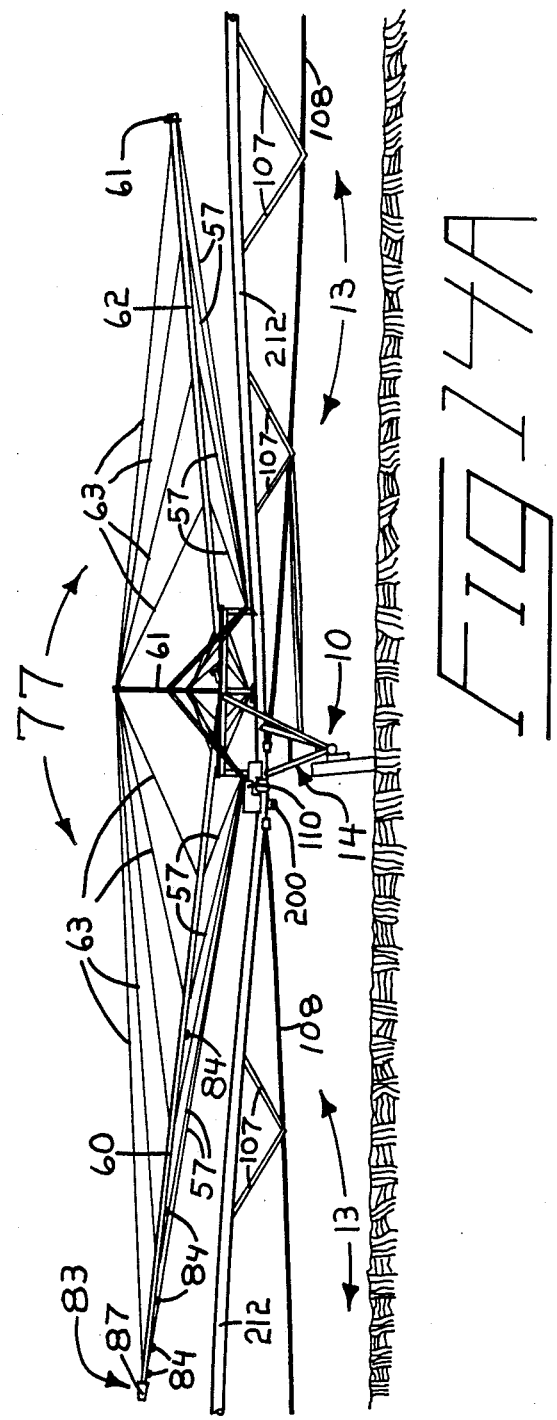

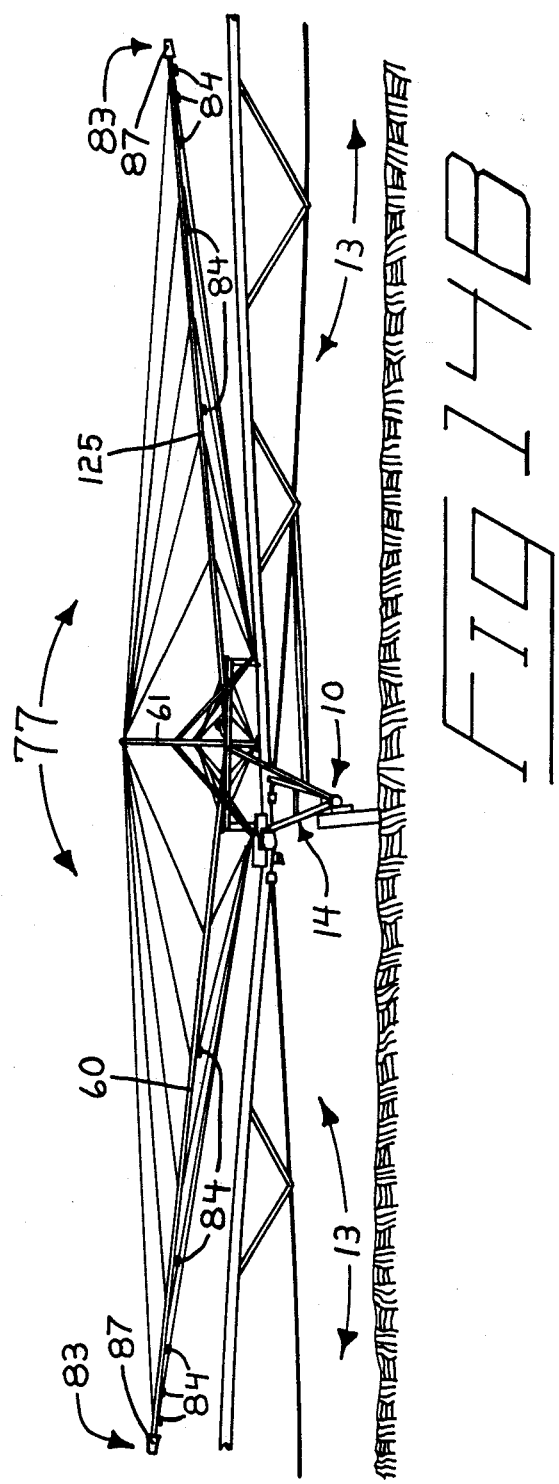

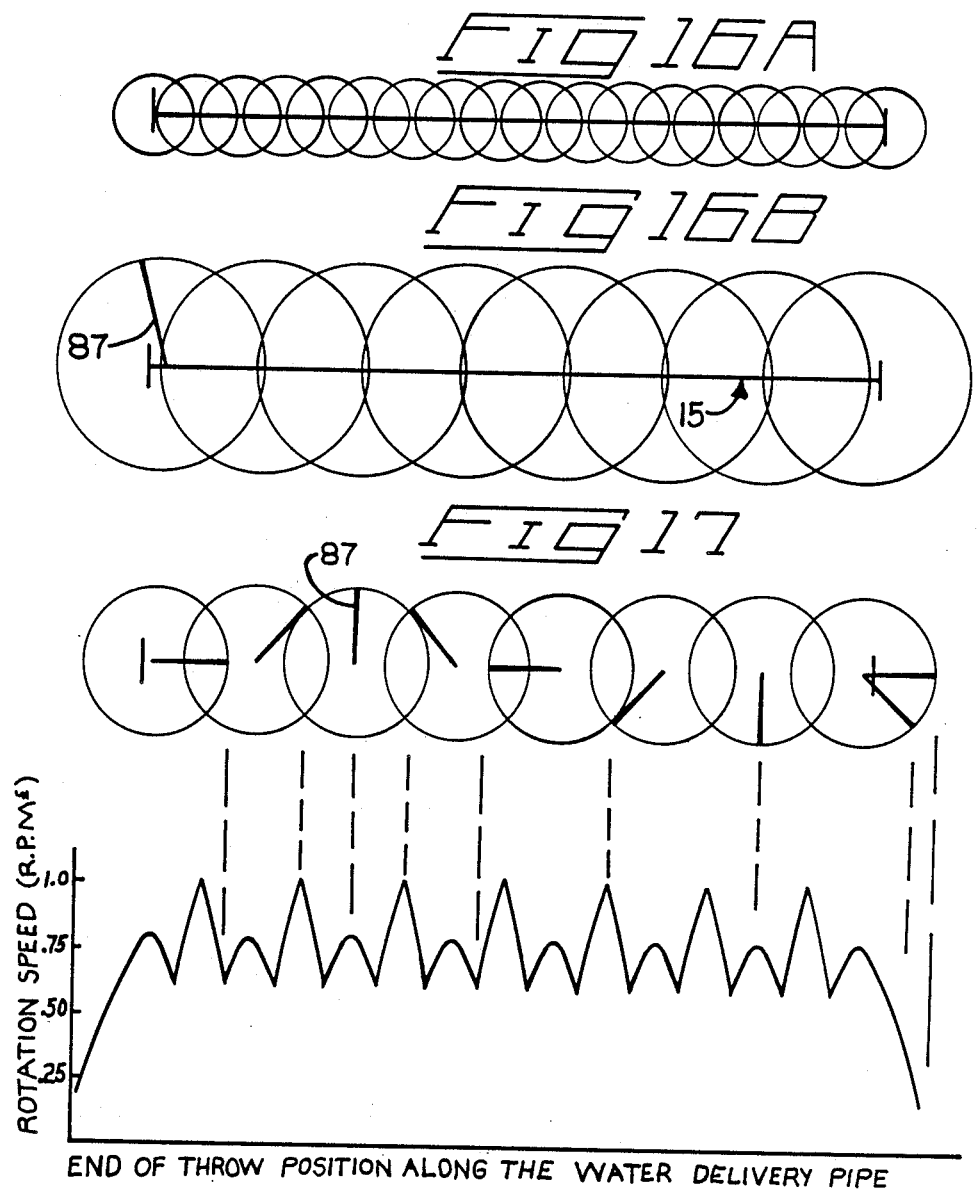

IRRIGATION SYSTEM

FIELD OF THE INVENTION

The present invention pertains to a new automated approach toward forwarding a water main connection which as a result enables novel irrigation practices.

DISCUSSION OF THE PRIOR ART

Movable sprinklers, including a series of nozzles mounted along a delivery pipe that moves laterally along a series of access valves, have been in use for decades. One approach has the movable delivery pipe stationary while irrigating. After irrigating, the delivery pipe is disconnected from the water main and moved forward to a successive access valve and then reconnected to the water main. However, it is highly preferable to slowly forward the delivery pipe during irrigation.

Many ways have been suggested to manually forward the connection after intervals of forward traveling irrigation. Manually forwarding a draggable hose is today's common practice. Manual connection forwarding introduces undesirable costs, inefficiencies and operational limitations to what is otherwise the most desirable method of irrigation water application.

Many methods have been suggested to automate the forwarding of the supply main connection. Suggested methods found include: Engel U.S. Pat. No. 2,750,228; Smith U.S. Pat. No. 3,381,893; Purtell U.S. Pat. No. 3,444,941; Rogers U.S. Pat. No. 3,463,175; (Von Linsowe U.S. Pat. No. 3,729,016; Standal U.S. Pat. No. 4,036,436; Stafford U.S. Pat. No. Re. 26,285; Nobel U.S. Pat. No. 4,295,607; and Nobel U.S. Pat. No. 4,274,584. All of these methods are very elaborate. Furthermore, all of the methods limit the delivery pipe to straight line travel only. Consequently, after completing an irrigation across a field, the delivery pipe must reverse travel the irrigated field in order to assume its original starting position. While lateral move irrigators display superior coverage and application qualities, inadequate connection means continue to hamper and thus severely restrict the use of these systems.

U.S. Pat. No. 4,295,607 to Nobel discloses a connector mounted to one end of a rigid swing arm. The other end of the rigid swing arm is pivotably mounted to one end of a jointed elbow contrivance movably carried along tracks on a conveyance means. Another end of the elbow pipe contrivance is attached to one end of a water delivery pipe. There is no suggestion to eliminate the conveyance means, elbow arrangement and supporting structure and simply pivotably attach the swing arm to the water delivery pipe. Furthermore, there is no suggestion to rotate the water delivery pipe between fields on both sides of a water main.

A series of rotatable water discharge booms mounted to a common delivery pipe has never been suggested in any orientation to the inventor's knowledge. Ede U.S. Pat. No. 3,942,722 suggests an oscillating set of booms mounted to a cart for travel with pressurized water supplied by a manually forwardable length of hose. It is noteworthy that the booms of the Ede reference do not rotate but oscillate.

U.S. Pat. No. 3,648,930 to Brown suggests a series of oscillating low volume chemical delivery arms supplied by a low volume piping network independent of an irrigation apparatus which supports the chemical application system. The arms serve to extend applicator nozzles outwardly to keep the applied chemical off of the apparatus supporting the chemical spray system. There is no suggestion to greatly enlarge and greatly elongate said chemical discharge arm to create an elongated water discharge boom and then mount a series of the discharge booms to a high volume elongated movable supply pipe for rotation instead of oscillation thereon.

In summary, lateral move sprinkler mounted water delivery pipes, adapted for continuous travel during water application, offer superior and uniform application properties while irrigating rectangular areas. These three qualities are most desirable. Unfortunately, all known suggested or practiced methods of automatically connecting the traveling delivery pipe to a stationary series of access valves are complicated, very costly and unreliable.

The present invention provides a unique connection approach. The delivery pipe travels while applying water and maintaining connection to a water main access valve by utilizing a conduit span as a pivoted swingable arm between a series of access valves and the traveling delivery pipe. The swing arm is pivotable at one end about a valve connector thereon. The swing arm is pivotably connected at its other end to the traveling delivery pipe. When the delivery pipe moves forward to a position half way between two successive access valves, the now trailing swing arm is disconnected and the free swing arm end with valve connector thereon is pivoted along the ground to the next access valve where the connector is once again connected to the water main.

The present connection approach offers the exclusive advantage of facilitating a controlled rotation of the delivery pipe substantially 180 degrees to the opposite side of the water main so that two fields may be irrigated with one length of water delivery pipe.

After traversing the field on this side of the water main, the water delivery pipe may once again be controlled to rotate substantially 180 degrees and will then have returned to its position when irrigation was begun with no back tracking across the previously irrigated field.

The advantages of the pivoting swing arm connection apparatus are many. First, the swing arm may be of sufficient length so that access valves may typically be spaced twice as far apart as presently practiced. Also, with the present system, only one connection device is required. The apparatus weight may be employed for opening the access valves while conventional approaches employ connectors requiring additional means to secure and then mechanically actuate said access valves. Furthermore, the present pivotable swing arm connection approach inherently offers simple and accurate control means for maintaining the water delivery pipe at a constant distance from the water main, for maintaining the delivery pipe perpendicular to said main and also for facilitating the forwarding of the valve connector along the series of access valves. The unique control means eliminates the conventional need for a guide wire stretched along the length of the field to be irrigated.

The pivoting swing arm connection apparatus enables rotation of the entire water delivery apparatus between fields along opposite sides of a common water main. Consequently, one length of delivery pipe can now traverse the same area that previously required twice said length with the connection methods as forementioned. Rotating the delivery pipe between adjacent fields enables the delivery pipe to traverse both sides of the water main in opposite directions eventually to result in a circuitous irrigation whereby the delivery pipe eventually assumes its original starting position.

The present invention also includes a unique water application approach. Elongated rotatable discharge booms may be mounted along an elongated lateral move water delivery pipe. The elongated rotatable booms greatly spread the area of coverage for a given length of delivery pipe. This enables the length of water delivery pipe to traverse great distances and thus irrigate large acreages. For instance, elongated rotatable discharge booms may be mounted to a lateral move delivery pipe allowing said delivery pipe to traverse and irrigate two to three times as much farmland as previously irrigated by standard lateral move systems.

An ultimate irrigation means is presented when elongated rotatable discharge booms are mounted along a lateral move delivery pipe employing the present pivotable swing arm connector. The resultant irrigator will traverse two to three times the area capable with standard lateral move systems of the same length. The connection means enhances the greatly increased coverage capacity afforded with rotatable discharge booms by allowing rotation of a water delivery pipe from one side to the opposite side of a water main.

The described present connection approach, by itself and in addition to the elongated rotatable discharge boom concept create a drastically less expensive, fully automated lateral move irrigation means. Coincidingly, a far simpler and much more reliable irrigation apparatus results as predicted by an approximate fifty percent relative reduction of the installed cost to irrigate with prior automated lateral move irrigators.

BRIEF DESCRIPTION OF THE DRAWINGS

A preferred form of the invention is illustrated in the accompanying drawings in which:

FIG. 7 is a side elevation of a swing arm apparatus of the present invention pivotably mounted at one end to a lateral move water delivery pipe with the apparatus of FIG. 4 mounted at the other swing arm end.

FIG. 8A is an enlarged elevation view taken on line 8—8 of FIG. 7 showing a universal pivot, a pivot angle measuring device, a cyclometer, and part of a rotatable discharge boom assembly;

FIG. 8B is a fragmentary side elevation view of the apparatus as shown in FIG. 8A;

FIGS. 9A, 9B, 9C, 9D and 9E are diagrammatic top plan views of a lateral move irrigator of the present invention at various positions during forward movement;

FIGS. 10A, 10B, 10C, and 10D are top plan views of a lateral move irrigator of the present invention at various positions during rotation between two fields on opposite sides of an adjacent water main;

FIG. 11 is a diagrammatic top plan view of a lateral move irrigator of the present invention illustrating a procedure for irrigating corners;

FIG. 12 is a control diagram of various components for operation of the present system;

FIG. 13A is a diagrammatic illustration of a mainline flow diverter utilized with the present invention;

FIG. 13B is the flow diverter shown in FIG. 13A including optional additional components;

FIG. 14A is an elevation view of a rotatable discharge boom assembly);

FIG. 14B is an alternate form of the rotatable discharge boom assembly shown in FIG. 14A;

FIGS. 16A and 16B are plan views of various sprinkler coverage patterns for lateral move irrigators;

FIG. 17 is a plan view of discharge boom coverage patterns with a graph taken from the view plotting discharge boom rotation speed versus discharge boom rotation position.

DETAILED DESCRIPTION

Figure 9A:
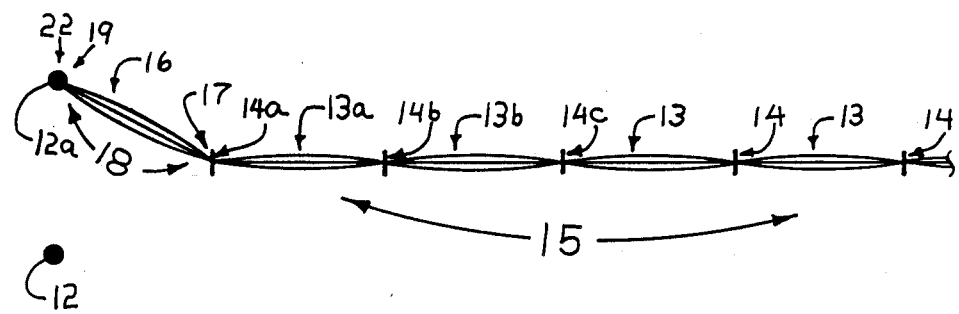

The present invention generally relates to lateral move irrigators. The present invention incorporates one or more lengths of trussed water delivery pipe 13, mounted atop movable carts 14 forming a linear series of trussed water delivery pipes as shown in FIG. 7 and FIG. 9A. A drive means 10 on each cart maintains linear alignment of the water delivery pipes 13 while powering each cart 14 to travel in a direction perpendicular to the length of the trussed water delivery pipes 13. A water applicator means 143 is connected along the series of trussed water delivery pipes 13 for selectively applying the water supplied by the trussed water delivery pipes 13 on to the field surface. The present invention may generally include trussed water delivery pipes 13, movable carts 14, drive means 10 and water applicator means 143. Hereafter the trussed water delivery pipes 13, movable carts 14, drive means 10, and water applicator means 143 will be grouped together and referred to as a lateral move water delivery pipe means 15 as shown in FIG. 7, FIGS. 9A-9E, and FIGS. 10A-10D.

The present invention is intended for use in conjunction with a water main 11, to be situated adjacent to one end of the present lateral move water delivery pipe means 15. The water main 11 may be parallel to the travel direction of the water delivery pipe means 15. Access valves 12 are mounted at appropriate intervals along the water main 11 enabling selective access to the water therein.

The present invention also involves a water delivery pipe rotation means 103 in combination with the forementioned water delivery pipe means 15 and in combination with a means for connecting the water delivery pipe means 15 to the succession of access valves 12.

Water delivery pipe rotation means 103 controls the drive means 10 of water delivery pipe means 15 in order to automatically rotate the water delivery pipe means 15 from the typical lateral move irrigator position adjacent along one side of the water main 11 to a diametrically opposed position on the other side of water main 11. Rotation of the water delivery pipe means enables automated connector forwarding and the subsequent application of water along both sides of a water main 11.

Water delivery pipe rotation means 103 synergistically furnishes elements of a new means for connecting a series of spaced access valves 12 mounted along a water main 11 to a water delivery pipe means 15. The new connector means 18 serves as an improved means of connecting a forward traveling water delivery pipe means 15 to the stationary series of access valves 12.

STRUCTURE

The present connector means 18 includes a swing arm means 16 as shown generally in FIG. 7. The swing arm means 16 may be a trussed span of water supply pipe 36 similar to the lengths of trussed water delivery pipe 13 utilized as part of the water delivery pipe means 15. The swing arm means 16 is connected to one end of the water delivery pipe means 15 as shown utilizing a pivot means 17 (FIGS. 8A and 8B) to allow angular movement in all directions between the swing arm means 16 and the water delivery pipe means 15.

The swing arm means 16 has an outer end 23 with a valve coupling means 19 and a swing arm length regulating means 30 mounted thereon as shown in FIGS. 1–5. The valve coupling means 19 provides selective connection and disconnection along the series of access valves 12. The swing arm length regulating means 30 is controlled to enable the water delivery pipe 15 to travel forward in a substantially straight line transverse to the delivery pipe length.

The valve coupling means 19 incorporates the available weight at the swing arm outer end 23 by employing downward travel to forcably align with, connect to, and forcably open successive access valves 12. Hydraulic cylinders 45 are pivotably mounted by hydraulic cylinder mounts 70 between the swing arm outer end frame 213 and a transport wheel frame 46 (FIGS. 1–5). Transport wheel frame 46 mounts to the swing arm outer end frame 213 with transport frame pivots 71 located therebetween allowing the transport wheel frame 46 to swing up and down so as to raise or lower a set of transport wheels 21 mounted to the outward swinging end of the transport wheel frame 46 when hydraulic cylinders 45 are retracted or extended respectively. The raising of transport frame 46 and transport wheels 21 has the effect of lowering the coupling means 19 to align and forcably open an access valve 12 as shown in FIG. 6. The lowering of transport wheels 21 serves to raise the coupling means 19 and thus disconnect the valve coupler body 24 from an access valve 12.

A valve coupler alignment means 100 (FIG. 6) includes a guide means 127 consisting of a steel cone 85 attached to the bottom end of coupler body 24. Raising the transport wheels 21 lowers the coupler body 24 with cone 85 attached. The cone 85 engages the top edge of an access valve body 97. The lowering swing arm outer end 23 places weight on the valve body 97. The engaged inclined surfaces of the cone cam against the valve body causes the cone 85 to travel horizontally to relieve the downward weight force.

Valve coupler alignment means 100 enables cone 85 to travel in the horizontal plane by utilizing available travel of the coupler body 24 along a horizontal axis substantially parallel to the length of the swing arm means 16 as furnished by the swing arm length regulating means 30 (FIG. 5) described later. Horizontal travel perpendicular to that of the swing arm length regulating means 30 is furnished to the valve coupler alignment means 100 by allowing the transport wheels 21 to rotate freely so that the swing arm outer end 23 may move when the aligning cone 85 is forced against the top edge of an access valve body 97. The horizontal force causing the transport wheels 21 to rotate is transmitted from the valve coupler body 24 to the swing arm outer end frame 213 by four horizontal rollers 53 (FIGS. 5 and 6). Horizontal rollers 53 enable the horizontal force to be transmitted to a set of H-beams 25 regardless of the couplers position along the horizontal travel axis of the swing arm length regulating means 30. Consequently, the lowering cone 85 bears against the top edge of the access valve body 97 and subsequently serves to facilitate horizontal alignment of the coupler body 24 so as to center the coupler body 24 directly over an access valve 12.

When further lowered the coupling means 19 contributes to an actuator means 101 as shown in FIG. 6. The bottom edge of the coupler body 24 slides over the top edge of an access valve body 97 locking the coupler body 24 from further horizontal movement. Continued lowering of the coupling means 19 engages the bottom edge of inner pipe 86 to the top surface of a three-spoked plunger ring 90 situated inside an access valve body 97. Spoked plunger ring 90 is preferably bolted to the top end of a plunger shaft 91. A flat rubber seal 93 mounts between two round plates 92 and 144. Flat rubber seal 93 is the same diameter as the lower round plate 92 and is slightly larger in diameter than the upper plate 144. Plates 92 and 144 along with seal 93 are mounted at the bottom end of plunger shaft 91. Plate 144 is preferably welded to plunger shaft 91 and plate 92 is bolted against seal 93. Water pressure pushes upward against the round plate 92 to seal the flat rubber seal 93 against a valve seat 94 when the access valve 12 is closed. When lowered, the coupling means 19 forces the inner pipe 86 against the spoked plunger ring 90 pushing it downward. Downward travel of ring 90 results in corresponding downward travel of plunger shaft 91 and round plates 92 and 144 with seal 93. Consequently, water is allowed to pass around plate 92 seal 93 and plate 144, through valve seat 94, into the inside of inner pipe 86 and eventually to the water delivery pipe means 15. The bottom edge of inner pipe 86 is mounted with a floppy seal 95 to prevent leakage between inner pipe 86 and the top surface of spoked plunger ring 90. The perimeter of spoked plunger ring 90 is fitted with a toleranced seal 96 to prevent leakage between the outer surface of plunger ring 90 and the inner wall of access valve body 97. A three-spoked bearing mount 88 holds a shaft bearing 89. Plunger shaft 91 travels longitudinally through shaft bearing 89 and consequently bearing mount 88 serves to hold plunger shaft 91 centered in the access valve body 97 and allows the plunger shaft assembly to travel up or down. Plunger ring 90 also serves to hold the top end of plunger shaft 91 centered in valve body 97.

Valve coupling means 19 also includes a telescoping conduit assembly 35 (FIGS. 2–5) which serves to hydraulically connect the movable valve coupler body 24 to the swing arm supply pipe 36. The telescoping conduit assembly 35 includes lengths of conduit 37 each with a mouth end 38 and a water seal 39 mounted inside the mouth end 38. Each conduit length 37 is mounted with a roller wheel 40 at both sides along the bottom of its mouth end 38. Roller wheels 40 roll along tracks 25 responsive to travel of the valve coupler body 24 along the same tracks 25. Conduit lengths 37 are sequentially smaller in diameter approaching the coupler body 24 to allow the coupler body 24 to push the conduit lengths 37 axially into each other when the coupler body 24 is moved toward the pivot means 17. A straight pipe 51 is preferably welded to the side of coupler body 24 to serve as the innermost pipe of the telescoping conduit assembly 35. Stop cables 41 are attached along the bottom of telescoping conduit assembly 35 between each successive mouth end 38 with the last cable 41 attaching to the coupler body 24. The arrangement of stop cables 41 serves to halt extension between conduit lengths 37 before separation occurs during travel of the coupler body 24 away from the pivot means 17.

Figure 2:
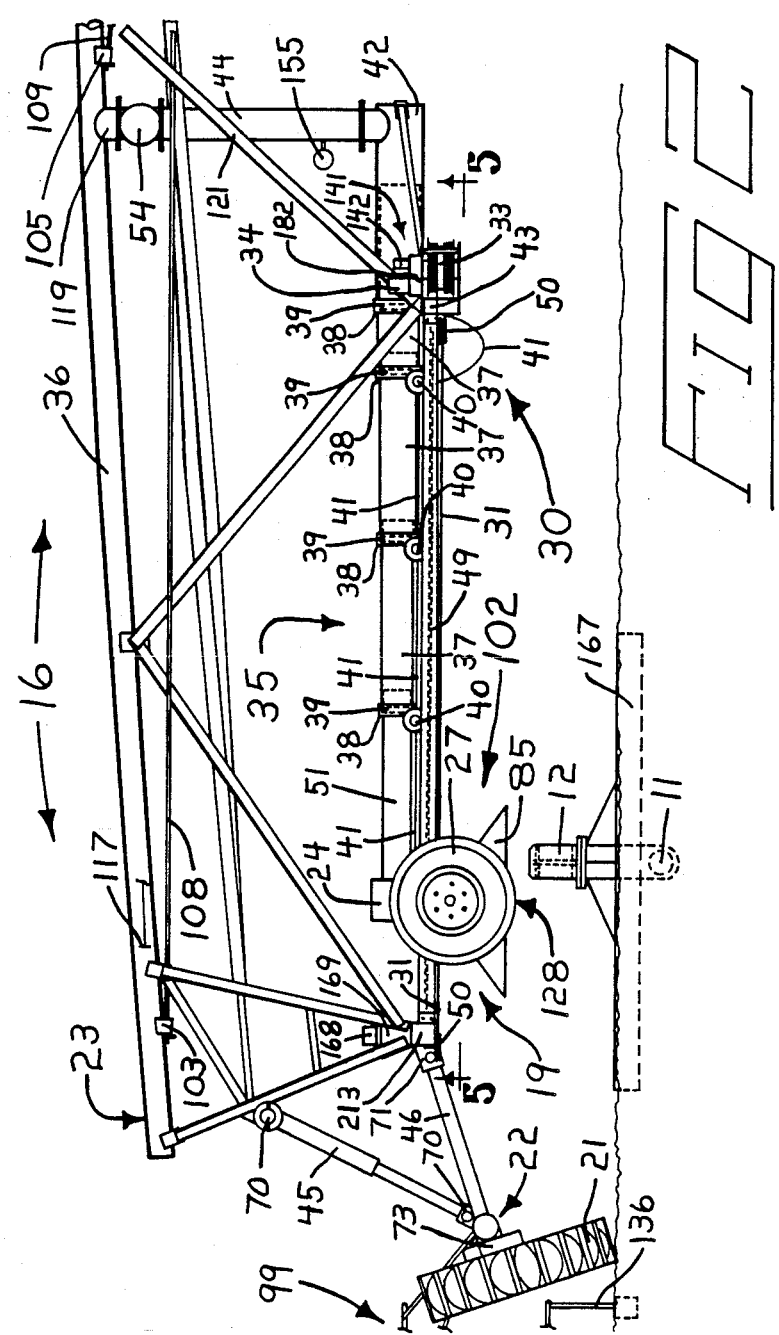
FIG. 2 is a fragmentary side elevation view of the apparatus as shown in FIG. 1.
Figure 3:
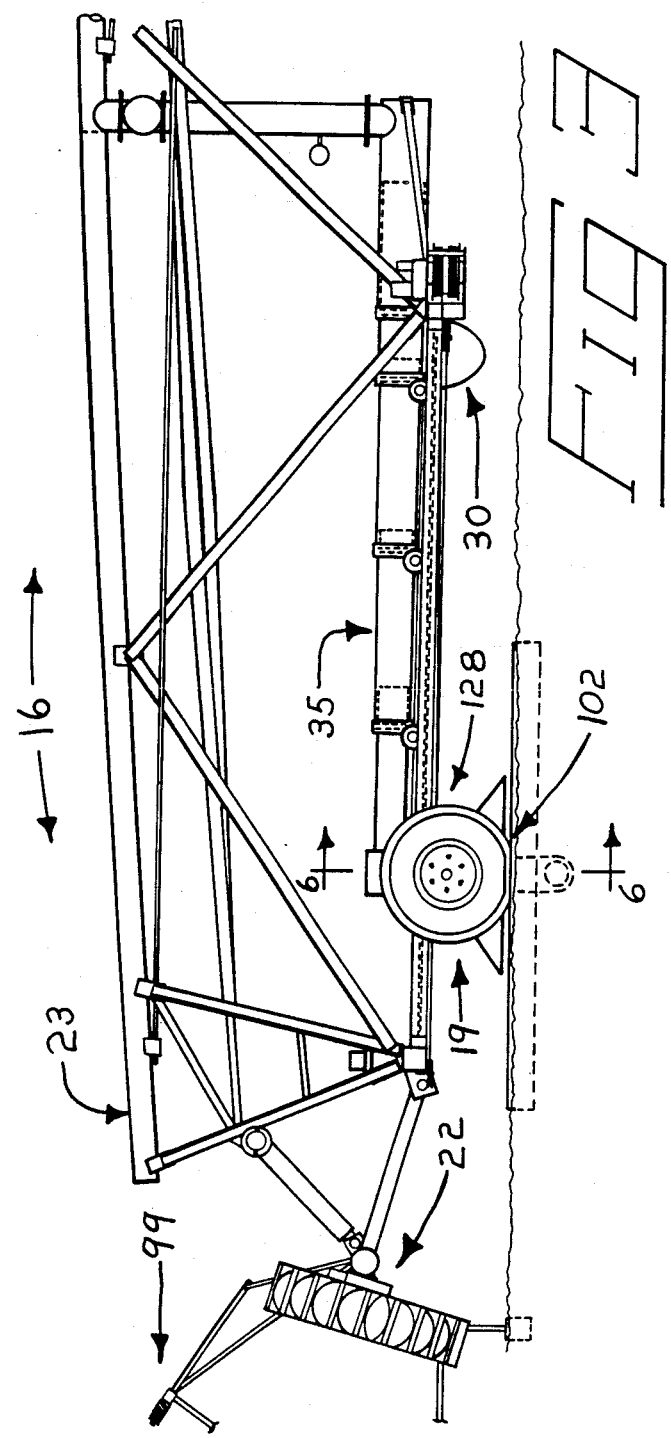
FIG. 3 is a view similar to the side elevation view of FIG. 2 with the valve coupler lowered onto the access valve.
Figure 4:
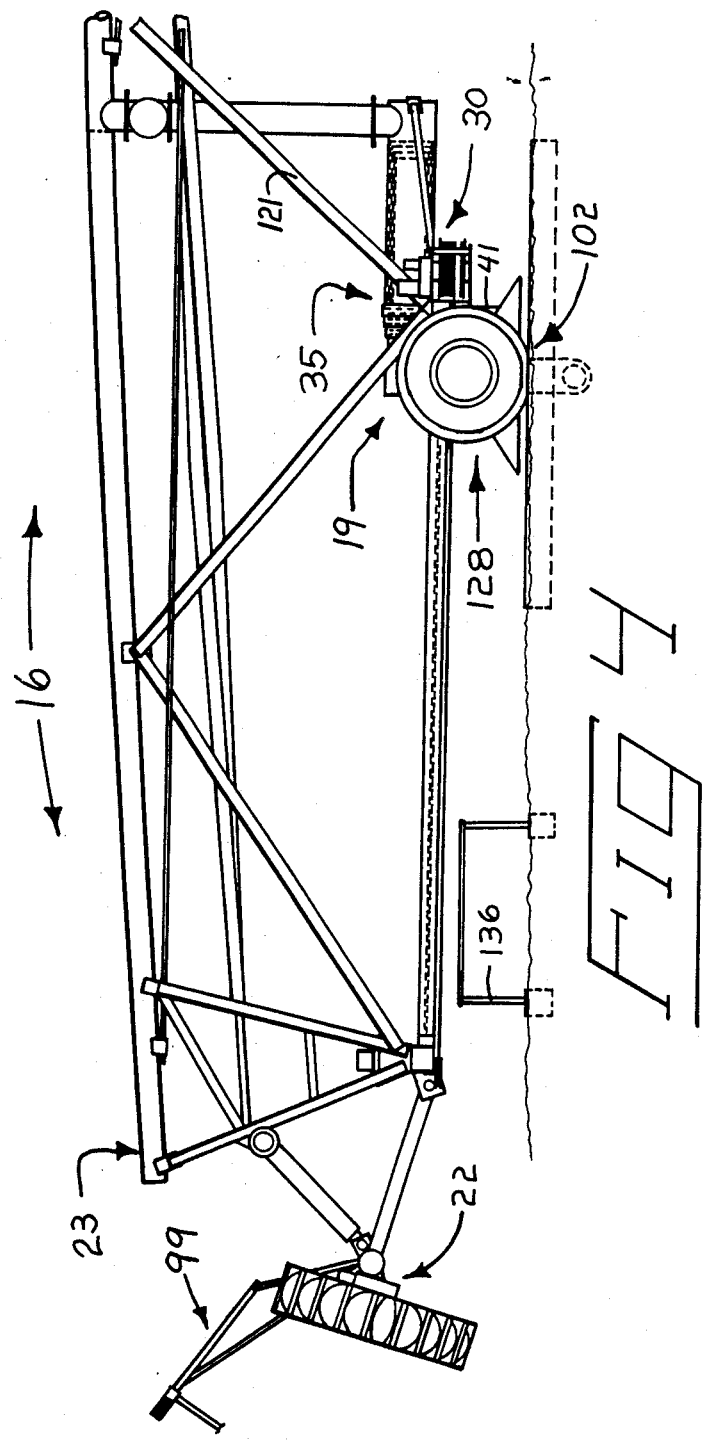
FIG. 4 is a side elevation view of FIG. 3 with the valve coupler in a retracted position along the swing arm apparatus.
Figure 5:
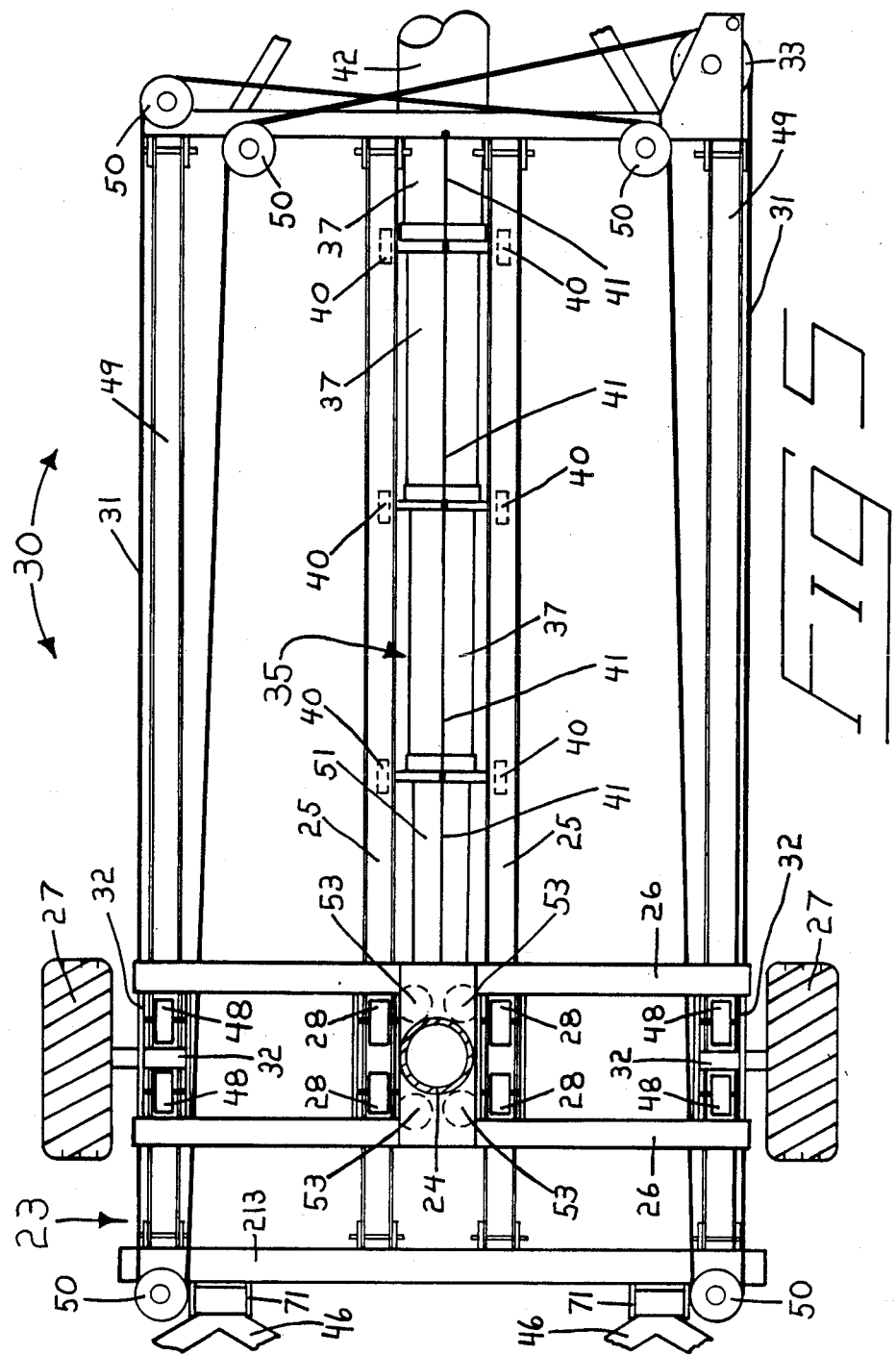
FIG. 5 is a fragmented bottom plan view taken on line 5—5 of FIG. 2.
Figure 6:
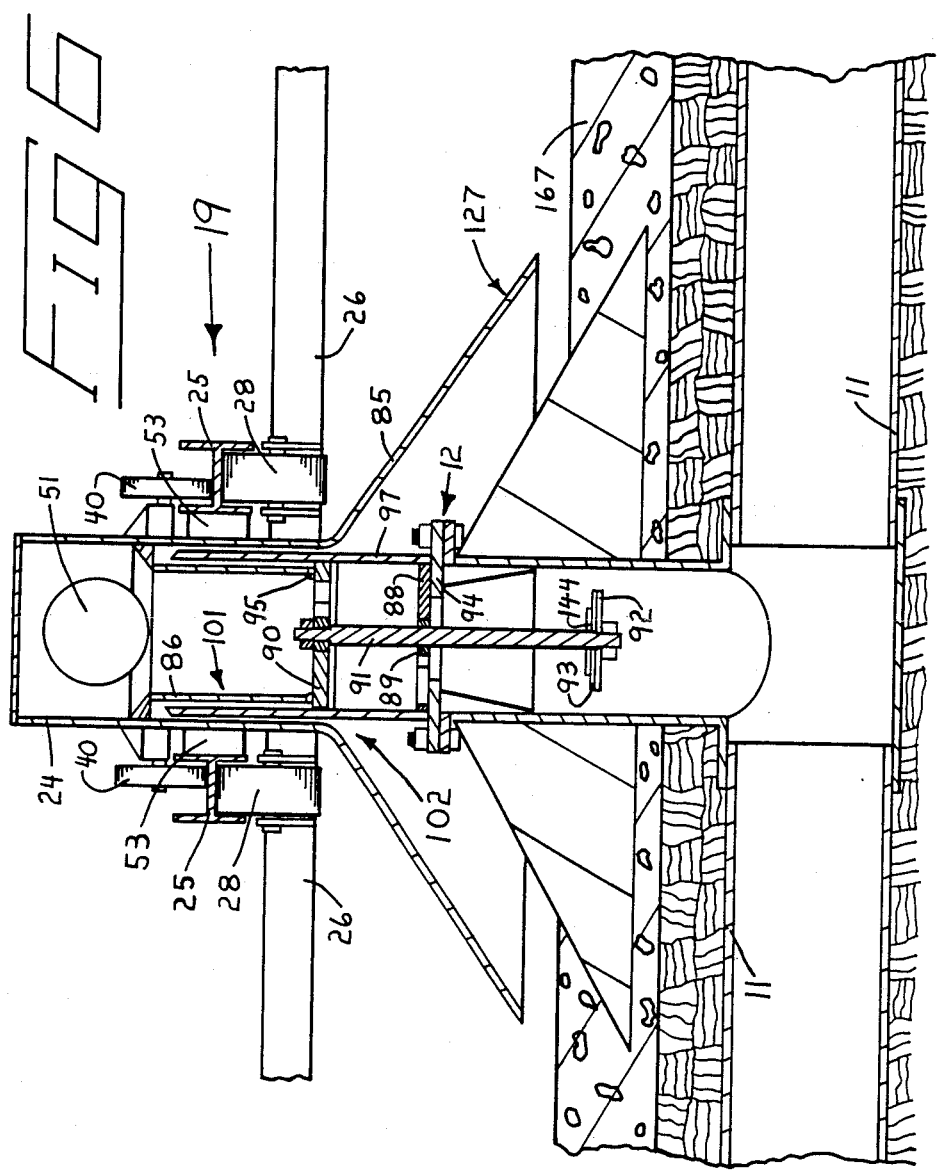
FIG. 6 is an enlarged fragmentary sectional view of a valve coupler engaged to an access valve taken on line 6—6 of FIG. 3.

The telescoping conduit assembly 35 incorporates a modified conduit length 42 (FIGS. 2–5). Modified conduit length 42 is of sufficient diameter to allow the remaining conduit lengths 37 and straight pipe 51 to slide inside of it. The mouth of conduit length 42 is preferably bolted to support beam 43 instead of mounting a set of roller wheels as do conduit lengths 37. The outward end of modified conduit length 42 elbows upward and is preferably bolted to a link pipe 44 (FIGS. 2–4). Link pipe 44 bolts to the bottom side of a main water valve 54 which bolts to a flanged opening 119 along the bottom side of the swing arm supply pipe 36 so as to hydraulically connect the telescoping conduit assembly 35 with the swing arm supply pipe 36. Flanged opening 119 also blocks off the unused end of water supply pipe 36 to eliminate unnecessary water weight at the swing arm outer end 23 when water is flowing.

Figure 1:
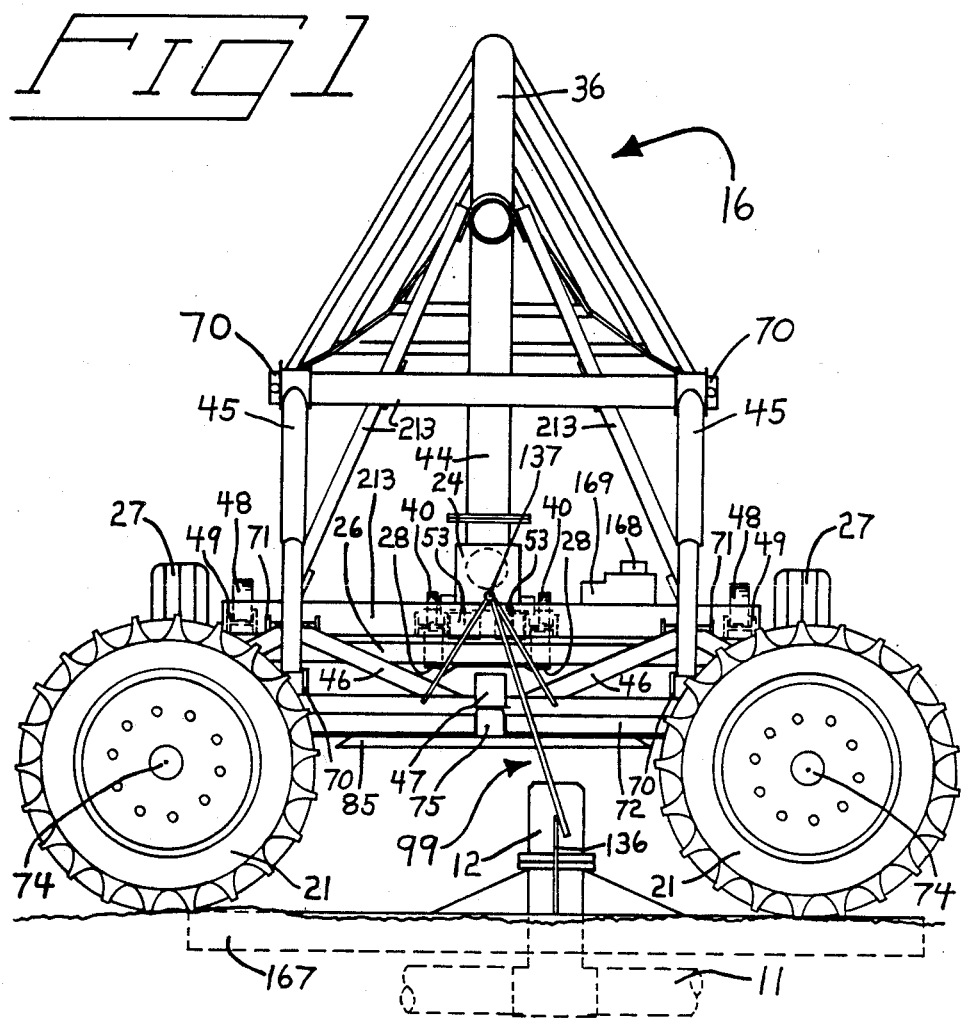
FIG. 1 is an end elevation view of a valve coupler and swing arm apparatus of the present invention located above an access valve.

In a lowered position, as shown in FIGS. 1 and 2, the previously mentioned transport wheels 21 may be rolled along the ground surface as part of a travel means 22 for transporting the swing arm outer end 23 with the valve coupling means 19 and swing arm length regulating means 30 mounted thereon between successively connectable access valves 12 as indicated by the dashed lines shown in FIGS. 9D and 9E. Travel means 22 includes an electric motor 47 (FIG. 1) to rotate a spur gear reducer 75. Spur gear reducer 75 consequently rotates drive lines 72 and planetary gear reducers 73 (FIG. 2) connected to the other ends of drive lines 72. Planetary gear reducers 73 have output shafts with hubs 74 which are bolted to and consequently rotate transport wheels 21. Spur gear reducer 75 and planetary gear reducers 73 are high efficiency and non-locking which permits the relatively free rotation required in the forementioned coupler alignment means 100.

The swing arm length regulating means 30 (shown best in FIG. 5), mounted at the swing arm outer end 23, provides to controllably vary the distance between the valve coupling means 19 and the pivot means 17 when the coupler body 24 is engaged to an access valve 12 and the water delivery pipe 15 travels forward. Coupler body 24 is mounted with rollers 28 (FIG. 6) enabling the coupler 24 to move along the length of a set of H-beam tracks 25 which act as guides for the rollers 28 and subsequently guide the valve coupler body 24.

Coupler body 24 is structurally connected by two tubes 26 to roller mounts 32 which are located on opposite sides of coupler body 24. The roller mounts 32 provide spindles for mounting support wheels 27. Rollers 48 are attached to mounts 32 for rotation about an axis parallel to the rotation axis of the spindles. Rollers 48 are guided during rotation and subsequent travel by H-beams 49. Consequently travel of coupler body 24 along tracks 25 results in corresponding travel of rollers 48 and support wheels 27 along H-beams 49.

Support wheels 27 serve as a ground support means 128 for the swing arm outer end 23 when the transport wheels 21 have been raised in order to connect valve coupler body 24 to an access valve 12. When the coupler body 24 is connected to an access valve 12, the support wheels 27 are subsequently anchored from all ground movement except rotation about the access valve 12 as utilized by a valve coupler rotation means 102 described later. With support wheels 27 anchored from travel, H-beams 49 and 25 travel geographically when the swing arm length regulating means 30 is operated.

As shown in FIG. 5, swing arm length regulating means 30 includes two lengths of cable 31 stretched around a group of similar pulleys 50 with each cable 31 attached opposite the other cable 31 at each of the two roller mounts 32. Pulleys 50 are mounted to the swing arm outer end frame 213 and also to support beam 43 at the ends of H-beams 49. A cable drum 33 is positioned in the place of one of the pulleys 50. The corresponding length of cable 31 is wrapped around cable drum 33 (in place of the pulley 50) with each end of this cable 31 attached to an individual roller mount 32 as described and shown.

Electric motor 34 serves to drive a planetary gear box 182. Gear box 182 in turn rotates cable drum 33. Rotation of cable drum 33 in either direction produces a similar directional pull on both roller mounts 32 to subsequently move H-beams 49 relative to support wheels 27 and simultaneously move H-beams 25 relative to coupler body 24.

A swing arm length measuring means 141 (FIG. 2) includes a coupler travel rotation counter 142 mounted and geared to gear box 182. Gear box 182 spins rotation counter 142 which in turn indicates the relative position of coupler body 24 along H-beams 25 for control purposes.

A valve coupler rotation means 102 includes the forementioned support wheels 27. Support wheels 27 are rotatable about a common axis with the coupler body 24 located between support wheels 27 along the axis. Such alignment provides pivotable ground support for the swing arm means 16 at the swing arm outer end 23 so that the swing arm means is freely rotatable about connection to an access valve 12 irregardless of the longitudinal position of the previously described swing arm length regulating means 30 as indicated by the extremes of positioning shown in FIGS. 3 and 4. The forementioned valve actuator means 101 (FIG. 6) has features that allow rotation between the coupler body 24 and a stationary access valve 12 when the coupler body 24 is connected to the access valve 12. Consequently, the swing arm means 16 may rotate when the valve coupling means 19 is connected to a stationary access valve 12.

Water delivery pipes 212 and swing arm supply pipe 36 utilize truss rods 108 (FIG. 7) stretched along the bottom sides of a series of support trusses 107 to rod mounts 103 at both ends of each pipe for the purpose of elevationally supporting each of the pipes 212 and 36 by tensioning the truss rods 108 so as to constitute a trussed pipe span. As shown in FIG. 7, an extra set of truss rods 109 extend from an adapted truss 106 attached to swing arm supply pipe 36 and extend toward the swing arm outer end 23 to be connected to an extra set of rod mounts 105 (FIG. 2). Truss rods 109 serve as a tie-in for utilizing the swing arm supply pipe to counterbalance the weight of the swing arm outer end 23 when the coupler body 24 approaches the position as shown in FIG. 4. One end of support members 121 mount near rod mounts 105 along swing arm supply pipe 36 with the other end of support members 121 mounted to support the ends of H-beams 49. Consequently, support member 121 is under maximum compression in FIG. 4.

The pivot means 17 shown in FIGS. 7, 8A and 8B includes a universal pivot 110a mounted between the swing arm supply pipe 36 of swing arm means 16 and a first delivery pipe span 13a of the water delivery pipe means 15. Universal pivot 110a incorporates an inverted ball 111 seated in a ball socket 112. Universal pivot 110a allows vertical angular movement between the swing arm supply pipe 36 and the first delivery pipe span 13a of the water delivery pipe means 15 as required with elevational variation in the terrain. Universal pivot 110a also allows horizontal angular movement between the trussed water supply pipe 36 and the first delivery pipe span 13a. Horizontal angular movement is required when the travel means 22 is utilized to transport the valve coupling means 19 between access valves 12 and also is required when the water delivery pipe means 15 travels straight forward with the coupler body 24 connected to an access valve 12.

Lateral move water delivery pipe means 15 require movable carts 14 mounted at both ends of one of the delivery pipes 13 along water delivery pipe means 15 so that both ends of all delivery pipes will be movably ground supported. First delivery pipe span 13a was chosen because of control considerations. First delivery pipe span 13a is similar to trussed water delivery pipes 13 of water delivery pipe means 15 except that movable carts 14a and 14b are mounted at ends of pipe span 13a instead of just one end as is common to the remaining delivery pipes 13 along water delivery pipe means 15.

A pivot angle measuring means 104 shown in FIGS. 8A and 8B serves to record the horizontal angular alignment between swing arm supply pipe 36 and first delivery pipe span 13a. Rotatable tubes 114 independently mount vertical bearing support 115 so each rotatable tube 114 may rotate in the horizontal plane about the bearing support 115 extending through its center axis. Two guy wires 116 mount at the ends of one of the rotatable tubes 114 and stretch to remote wire mounts 117 (FIG. 2) located at the swing arm outer end 23. Two similar guy wires 116 mount to each end of the other rotatable tube 114 and stretch to wire mounts 117 at the remote end of first delivery pipe span 13a. Consequently, horizontal angular movement between the swing arm supply pipe 36 and the first delivery pipe span 13a will result in angular movement between rotatable tubes 114. A rack gear 118 mounts to one end of one of the rotatable tubes 114. Mounted to the adjacent end of the other tube 114 is a pivot angle rotation recorder 120. Angle recorder 120 includes a gear to mesh with rack gear 118 so that angular movement between tubes 114 will spin angle recorder 120 serving as a means to register the alignment between swing arm supply pipe 36 and first delivery pipe span 13a. A similar means may be utilized to linearly align all of the trussed water delivery pipes 13 along water delivery pipe means 15. However, alignment along delivery pipe means 15 is not so critical and consequently simpler means for measuring the alignment may be utilized.

A cyclometer means 130, shown in FIG. 8A, serves as a means to measure or predict the distance traveled by the water delivery pipe means 15 following the most recent connection to an access valve 12. Cyclometer means 130 is mounted to the movable cart 14a. Cyclometer means 130 includes a ground engaging wheel 131. Ground engaging wheel 131 includes an axle which mounts to vertical fork 132. Vertical fork 132 has a pipe 139 preferably welded to its top end. Pipe 139 slides inside an extension tube 133. A fork spring 134 is positioned outside extension tube 133 between the top end of extension tube 133 and a plate welded to the top end of vertical fork 132 so as to furnish constant downward pressure on ground engaging wheel 131 for maintaining wheel 131 in contact with the ground despite terrain irregularities. A cyclometer register 135 mounts vertical fork 132 and is geared to the axle of ground engaging wheel 131. Consequently, rotation of wheel with axle 131 drives cyclometer register 135 which serves to measure forward travel of the adjacent powered movable cart 14a. Optionally, forward travel of movable cart 14a may be recorded by registering the rotation of the ground engaging wheels attached to movable cart 14a or forward travel distance may be predicted by monitoring a drive motor 152 which powers the travel of movable cart 14a.

An access valve detection means 99, shown in FIGS. 1, 2, 3, and 4, provides for detecting proximity to an access valve 12 in order to appropriately halt forward travel of the swing arm outer end 23. A ground anchored horizontal trip bar 136 is anchored adjacent to a concrete pad 167 poured around each access valve 12. Trip bar 136 is engaged by a detector arm attached to a tripswitch 137 which may be mounted to transport wheel frame 46.

The present invention provides a new means of water application. Rotatable water discharge boom means 77 are mounted on top of the movable carts 14 as shown in FIGS. 7, 8A, 8B, 14A, and 14B. (Rotatable discharge boom means 77 could be mounted to the underside of each trussed water delivery pipe means 13 with advantageous results. However, movable carts 14 provide much greater stability and thus allow much longer and heavier booms to be mounted along the water delivery pipe means 15.

Rotatable discharge boom means 77 (FIG. 14A) may include an elongated discharge boom 60 extending outward from a hydraulic connection to a center mast 61. Hydraulically connected and extending outwardly from center mast 61 in the opposite direction of boom 60 is a counterweight boom 62. Both boom 60 and boom 62 are elevationally supported by guy wires 63 attached along the length of the booms with each guy wire attached at its other end to the top of center mast 61. Center mast 61 is hydraulically connected to a trussed water delivery pipe 13. Boom 60 discharges water received from center mast 61 for the purpose of irrigating. Boom 62 fills with water from center mast 61 and may discharge a small amount of water from a mechanical pressure valve 69, located at the outer boom end, until all air has been pushed out of the boom and the water pressure then closes the pressure responsive pressure valve 69. The water filled boom 62 acts as a counterweight to the water filled and discharging boom 60.

A steel ring 64 is attached along the bottom side of both booms 60 and 62 as part of a means to support the booms and also to rotate the booms about an axis extending through the length of the center mast 61. Ring 64 is T-shaped in cross section (FIG. 15B), with the leg of the T-shaped ring 64 projecting horizontally and outward. Grooved wheels 65 are constructed to accept the leg of the T-shaped ring 64 and consequently mount the outer side of the ring 64 as shown.

Each grooved wheel 65 includes two steel plates 202 preferably bolted together with a spacer 203 in between the plates 202. Bolts 204 extend through the plates 202 and spacer 203 with nuts 205 tightened onto bolts 204 to secure the assembly. A bearing 206 is fitted inside the perimeter of spacer 203 and between the plates 202. Bolt 201 extends through the inner race of bearing 206 and is secured to a support frame 66. Consequently, grooved wheel 65 with the outer race of bearing 206 may spin freely about the stationary inner race of bearing 206 and subsequently about the bolt 201. Two nylon washer bearings 207 mount outside the perimeter of spacer 203 and between the steel plates 202. The leg of the T-shaped rolled ring 64 fits in between the nylon bearings 207 as shown.

Eight of the grooved wheels 65 mount the rolled ring 64 of rotatable discharge boom means 77 with each wheel 65 bolted to the support frame 66 by bolt 201. Support frame 66 is attached to a movable cart 14 by two supports 67 and is also attached to the associated water delivery pipe 13 in two places by supports 68. Support frame 66 is mounted by a rotation drive motor 59 (FIG. 8B). Drive motor 59 rotates a rubber drive wheel 208 against the leg of the T-shaped rolled ring 64 so as to rotate the ring 64 and subsequently the discharge boom 60 and counterweight boom 62.

Supports 55 (FIGS. 8A and 8B) attach to the center mast 61 and to the rolled ring 64 in such a manner as to extend outward and downward from center mast 61 to an extended end 56. Attached at the extended end 56 are guy wires 57 stretched to attach along the length of booms 60 and 62 for insuring that booms 60 and 62 are prevented from swaying sideways. A cable 146 extends between the extended ends 56 of each set of two supports 55 located on opposite sides of the same boom 60 or 62. A cable 126 attaches at each extended end 56 and stretches to one of two tighteners 58 each mounted on one of two supports 52. Tighteners 58 provide for tensioning cables 126 and 146 and ultimately for tensioning guy wires 57. Supports 55 and supports 52 also serve to provide support between the center mast 61 and ring 64.

A plurality of spokes 122 (FIGS. 8A and 8B) hook to spoke mounts 123 located along center mast 61. Spokes 122 extend from spoke mounts 123 and hook to rolled ring 64 for supplying added support between center mast 61 and rolled ring 64.

Figure 15A:
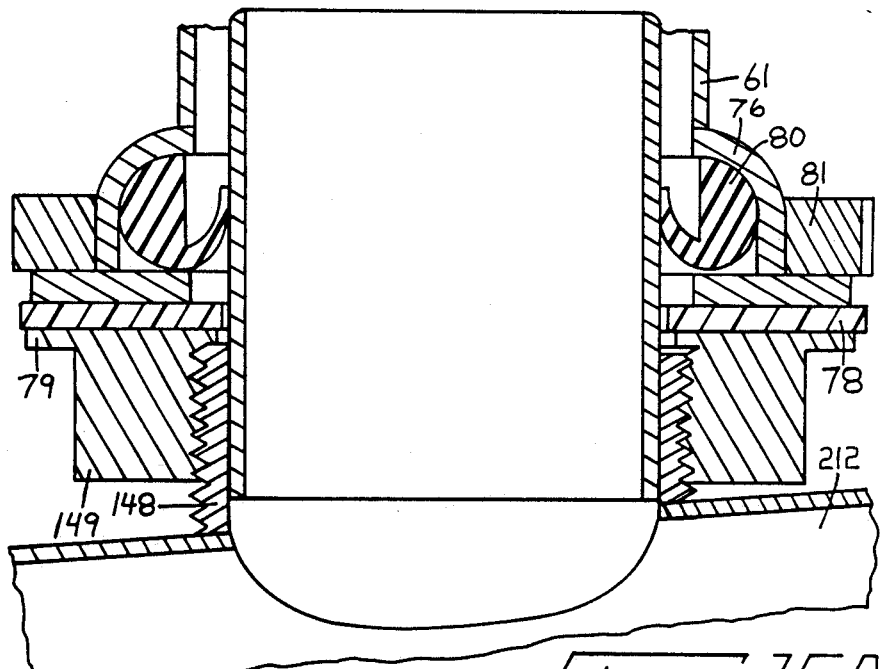
FIG. 15A is an enlarged fragmentary sectional view of the hydraulic connection between a rotatable discharge boom assembly and a water delivery pipe.
Figure 15B:
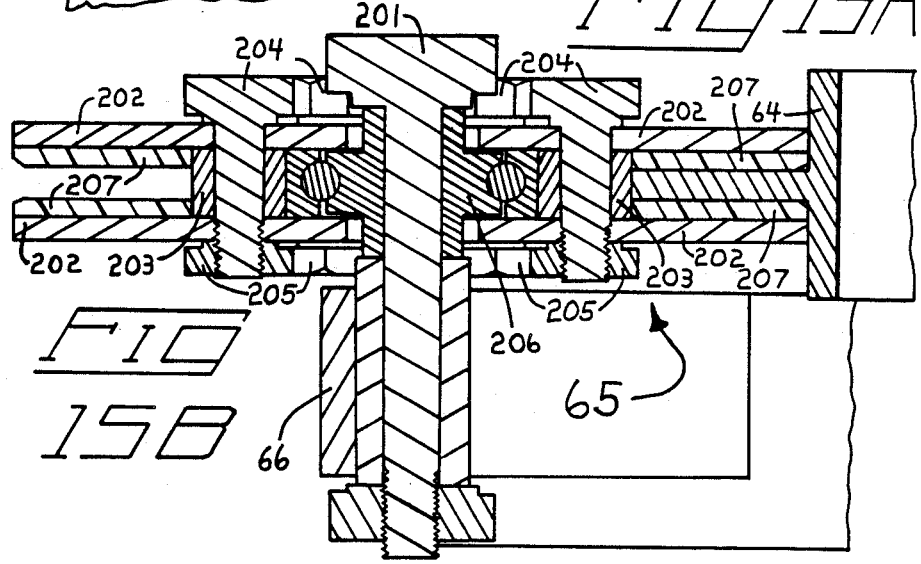
FIG. 15B is an enlarged fragmentary sectional view of a grooved wheel engaged to the rolled ring of a rotatable discharge boom assembly.

FIG. 15A shows the bottom end of center mast 61 with a support cup 76. The support cup 76 utilizes the surface of a horizontal plate 79 attached to the bottom of the cup 76 for bearing the apparatus weight on top of a nylon washer bearing 78. Washer bear 78 sits on top of and acts against a similar flat surface 79 preferably welded to an adjusting nut 149. Adjusting nut 149 threads onto an upwardly protruding outlet pipe 148 preferably welded to the water delivery pipe 13. Support cup 76 also holds a water seal 80 which serves to prevent leakage between the threaded outlet pipe 148 and the center mast 61.

Attached to the bottom of center mast 61 on the outside of support cup 76 is a large diameter ring gear 81. Ring gear 81 meshes with the gear of a rotation counter indexer 82. Indexer 82 is mounted to the adjacent water delivery pipe 13 and serves to monitor the rotation position of the rotatable discharge boom means 77 as part of a rotation speed control 145 described later.

It is advantageous to elongate the water discharge boom 60 as far as possible. A 60 foot long discharge boom 60 is shown in FIG. 14A. The boom 60 tapers to a smaller diameter approaching an outer end 83. The tapering serves to shift the center of mass of boom 60 towards the center mast 61 to reduce the possibility of tipping.

An end nozzle means 87 is attached to the boom outer end 83 to discharge water therefrom substantially in the outward direction as shown. Nozzle means 87 may discharge a high volume of water while retarding the potential available throw distance. The available throw distance may be retarded in order to produce higher quality water droplets and also to reduce the effect of wind. To achieve this, nozzle means 87 may be comprised of a group of smaller nozzles directed in the same outward direction thus achieving high volume output while reducing the throw distance.

A series of discharge nozzles 84 may be mounted along the bottom of the discharge boom 60. The series of nozzles is arranged to proportionally increase the output of water approaching the outer end 83. This may be accomplished by either decreasing the spacing between the discharge nozzles 84 approaching the outer end 83, as shown in FIG. 14A., or by increasing the aperture size, along an equally spaced series of discharge nozzles 84, approaching the outer end 83.

A modified rotatable boom embodiment shown in FIG. 14B may optionally be utilized as a rotatable boom means assembly 77 by lateral move irrigators in place of the rotatable boom embodiment shown in FIG. 14A. The embodiments of FIGS. 14A and 14B are substantially identical except that an additional discharge boom 125 is mounted in the place of counterweight boom 62 shown in FIG. 14A. Discharge boom 125 is substantially identical to the discharge boom 60 extending in the opposite direction. Consequently, the embodiment of FIG. 14B discharges water from booms extended in opposite directions from center mast 61 and is rotatable about the axis that extends through the length of the common center mast 61.

OPERATION

The connector means 18 and subsequently the water delivery pipe means 15 utilize a control means 150 to actualize operation of the present system. The various electrical components and the relationship between them are illustrated in the control diagram as shown in FIG. 12.

Control means 150 includes programmable controller 160. Programmable controller 160 may be comprised of commercially available components arranged to interpret signal impulses and, according to the appropriate programmed response, initiate or stop operation of various electrically controlled components over selected time periods. Programmable controller 160 includes logic means 170 as the means to store the programmed information utilized for providing automated and sequential operation. Logic means 170 is a commercially available component.

A power means provides the electricity to power the drive means 10 of the water delivery pipe means 15 and the control components shown in FIG. 12. The power means may include a diesel generator 245 mounted to one of the movable carts 14 (FIG. 7). Alternately, electricity may be produced by a generator drive by a water powered motor. The water motor would be hydraulically connected to the water delivery pipe means 15 or the connector means 18.

Describing operation of the present invention may best begin when the water delivery pipe means 15 and connector means 18 are positioned as shown in FIG. 9A. (The dashed lines in FIGS. 9A–9E and 10A to 10D illustrate previous positions of the connector means 18 and the water delivery pipe means 15 where operational changes occur and also illustrate the paths traveled by the movable carts 14 preceding the present position shown.) The water delivery pipe means 15 has previously been applying water while traveling forward adjacent to water main 11 and is now situated somewhere between ends of the field being irrigated. Valve coupling means 19 has just been forwarded from a previous connection to an access valve 12 and has now been again connected along the series of access valves 12 to access valve 12a.

The valve coupling means 19, when connected to access valve 12a, has subsequently opened the access valve 12a allowing the pressurized water in water main 11 to flow into and through the connector means 18, through water delivery pipe means 15 and finally on to the ground surface. The flowing pressurized water is detected by a water pressure sensor 155 (FIG. 2). Water pressure sensor 155 signals controller 160. Controller 160 responds according to logic means 170 by switching on percentage timer 156.

Percentage timer 156 is a commercially available and conventionally employed component providing manually adjustable control for selectively prescribing the amount of water applied when the water delivery pipe means 15 traverses and subsequently irrigates a field. Percentage timer 156 accomplishes this by dictating the rate of simultaneous forward travel at movable carts 14a and 14b. Movable carts 14a and 14b are powered by drive motors 152 and 157 respectively. Drive motors 152 and 157 typically have only one forward speed. Consequently, percentage timer 156 dictates the rate of forward travel by regulating the percentage of time drive motors 152 and 157 operate. For example, percentage timer 156 might be manually set to power the motors 152 and 157 for ten seconds and then discontinue power for twenty seconds. Maximum operation time of drive motors 152 and 157 results in a minimum amount of water applied. More water is applied when the drive motors 152 and 157 are operated less percentage of time.

When movable carts 14a and 14b (FIGS. 7 and 9A) simultaneously travel forward, the angular alignment between the first span 13a and the second span 13b along water delivery pipe means 15 will be altered because movable cart 14c remains stationary. The altered alignment is detected by means typical to the industry (FIGS. 9A and 9B) which operates the drive motor 158 of drive means 10 to forwardly move the movable cart 14c attached to the outer end of the second span 13b. Movable cart 14c travels forward until first span 13a and second span 13b are once again in linear alignment at which point the drive motor 158 is switched off. The same means of control is employed for maintaining linear alignment between the remaining trussed water delivery pipes 13 along the water delivery pipe means 15. Consequently, simultaneous forward travel of movable carts 14a and 14b initiates subsequent similar forward travel of all remaining movable carts 14 of the water delivery pipe means 15. The forementioned means for forwarding and linearly aligning a water delivery pipe means 15 is commonplace in the industry.

The forwardly moving water delivery pipe means 15 carries the end of the swing arm means 16 connected atop movable cart 14a. When the water delivery pipe means 15 travels forward, the swing arm means 16 and valve coupling means 19 rotate about the connection of coupler body 24 to an access valve 12. The rotating swing arm means 16 produces constant angular change of the alignment between the swing arm means 16 and the straight forward traveling water delivery pipe means 15. Coinciding with the forementioned activation of percentage timer 156 is the activation of the cyclometer rotation register 135 (FIG. 8A). Programmable controller 160 monitors the signal from cyclometer register 135 to measure the distance traveled by movable cart 14a after each most recent connection of valve coupling means 19 to an access valve 12. When movable carts 14a and 14b have just completed an interval of forward travel as dictated by percentage timer 156, the travel distance information from cyclometer register 135 is interpreted by controller 160 by making reference to logic means 170 in order to determine what the alignment angle should be between the rotating swing arm supply pipe 36 and the straight forward traveling first span 13a of the water delivery pipe means 15. Programmable controller 160 then makes reference to the pivot angle recorder 120 (FIGS. 8A and 8B) to determine what the actual angle is between swing arm supply pipe 36 and the first span 13a. If the angle as registered by pivot angle recorder 120 differs from the prescribed angle from logic means 170, then the water delivery pipe means 15 is out of perpendicular alignment with the water main 11 and an adjustment must be made.

A delivery pipe positioning means 20 (FIG. 12) is employed for adjusting the alignment between the water delivery pipe means 15 and the water main 11 responsive to the information from pivot angle recorder 120, cyclometer register 135, and logic means 170 in order to retain a perpendicular orientation. Programmable controller 160 determines whether water delivery pipe means 15 is angled ahead or behind relative to a line perpendicular to the water main 11. A position ahead of perpendicular is rectified by operating drive motor 152 of movable cart 14a until the signal from pivot angle recorder 120 indicates that the proper alignment has been achieved and consequently the programmable controller 160 switches off drive motor 152. If the water delivery pipe means 15 is found to be aligned behind a line perpendicular to the main line, the programmable controller 160 operates drive motor 157 until the signal from pivot angle recorder 120 indicates to the controller 160 that the alignment has been corrected at which point controller 160 switches off drive motor 157.

As the water delivery pipe means 15 travels forward with the coupler body 24 connected to an access valve 12, a fixed length swing arm would cause the movable carts 14 of the delivery pipe means 15 to follow the paths as shown by the dashes lines in FIG. 9E. This travel path is functional but will generate a large horizontal force on the connected access valve 12 along with associated pushing and pulling along the length of the water delivery pipe means 15. In order to eliminate most of the undesirable horizontal force it is preferable to adjust the length of the swing arm means 16 as the water delivery pipe means 15 travels forward. Consequently, the distance between the access valve 12 and the water delivery pipe means 15 may be regulated as the water delivery pipe means 15 travels forward. This allows the delivery pipe means 15 to travel forward in a substantially straight line. A previously described swing arm length regulating means 30 is utilized for this purpose.

After connection of coupler body 24 to an access valve 12, water delivery pipe means 15 begins forward travel and irrigation. As described, the forward travel is measured by cyclometer rotation register 135. Programmable controller 160 may analyze the signal from cyclometer rotation register 135 in relation to programmed information from logic means 170 to determine what the correct positioning of the swing arm length regulating means 30 should be relative to the changing position of the water delivery pipe means 15. The actual positioning of the swing arm length regulating means 30 is measured by the forementioned coupler travel rotation counter 142. Programmable controller 160 compares the actual position measured by coupler travel rotation counter 142 with the required position from logic means 170 and determines which direction to rotate electric motor 34 and subsequently cable drum 33 in order to obtain proper positioning. Rotation of electric motor 34 is discontinued when the programmable controller 160 determines that the proper alignment has been achieved.

While the water delivery pipe means 15 travels from the position shown in FIG. 9A, having just connected to access valve 12a, to the position as shown in FIG. 9B where swing arm delivery pipe 36 and water delivery pipe means 15 are longitudinally aligned, the swing arm length regulating means 30 is operated by programmable controller 160 to shorten the distance between the valve coupling means 19 and the pivot means 17 (FIG. 7). The position shown in FIG. 9B constitutes the shortest distance between the pivot means 17 and an access valve 12 when the water delivery pipe means 15 travels forward. Consequently the swing arm length regulating means 30 is residing in a fully retracted position similar to that shown in FIG. 4. While the water delivery pipe means 15 travels from the position shown in FIG. 9B to the position shown in FIG. 9C, programmable controller 160 controls the swing arm length regulating means 30 so as to progressively increase the distance between valve couping means 19 and the pivot means 17.

Forward travel of water delivery pipe means 15 is halted by programmable controller 160 according to the signal from cyclometer rotation register 135 when the water delivery pipe means 15 reaches the position as shown in FIG. 9C. Subsequently the swing arm length regulating means 30 has been operated to extend a distance approaching the maximum extension. (Enough extension remains to enable coupler travel for alignment with the next access valve.) The water delivery pipe means 15 is now in a geographical position (FIG. 9C) where the distance between pivot means 17 and the connected access valve 12a has been recorded by cyclometer rotation register 135 to be the same as the distance between the pivot means 17 and the next available access valve 12b.

The water delivery pipe means 15 may stop in the position as shown in FIG. 9C. During this time the connector means 18 may be controlled according to logic means 170, by programmable controller 160, to operate the valve coupling means 19 and valve coupler travel means 22. This is done in order to disconnect and transport the valve coupler 24 across the ground to a position above the next access valve 12b. (Typically, to apply a minimum amount of one half inch of water onto the ground surface, the water delivery pipe means 15 needs to travel only 0.05 miles per hour. Consequently forward travel of the water delivery pipe means 15 could actually continue while the valve coupling means 19 is transported between access valves 12 at a speed of two to three miles per hour.)

Programmable controller 160 begins disconnection from access valve 12a by signaling an electrically actuated up/down hydraulic valve 168 to be switch to the down position and by signaling main water valve 54 to close. In the down position, hydraulic valve 168 connects the pressure side of a hydraulic pressure means 169 to the set of hydraulic cylinders 45. Hydraulic pressure means 169 includes commonly available electrically powered pump and pressure tank means for supplying fluid under pressure for operation of the hydraulic cylinders 45. The fluid from pressure means 169 serves to extend hydraulic cylinders 45. Extending hydraulic cylinders 45 lowers the transport frame 46 with transport wheels 21 and consequently raises the valve coupling means 19. When hydraulic cylinders 45 are fully extended, the connector means 18 is positioned similar to the positions shown in FIGS. 1 and 2 except that the valve coupling means 19 will be in substantially vertical alignment with the access valve 12a. The closed main water valve 54 prevents water from draining out of the coupler body 24 and washing out of the soil around pivot pad 167 when coupler body 24 has been disconnected from access valve 12a.

With the transport wheels 21 in the lowered position, the valve coupler travel means 22 is further operated by programmable controller 160 which now signals a five position switch 172 to power drive motor 47 at a full speed forward setting. The five settings of five position switch 172 include full speed forward, slow speed forward, stop, slow speed reverse, and full speed reverse. Drive motor 47 powers the transport wheels 21 in order to forwardly move the swing arm outer end 23 and the valve coupling means 19. Swing arm outer end 23 moves along the ground in an arc path as shown in FIG. 9D about the pivot means 17 (FIGS. 7, 8A and 8B).

Arc travel of the swing arm outer end 23 continues as fast as the structure will allow, around 3 miles per hour, until a signal from the pivot angle recorder 120 indicates to the programmable controller 160 that the next access valve 12b is close ahead. Responding to the information from angle recorder 120, programmable controller 160 switches five position switch 172 to the slow speed forward setting. Consequently, drive motor 47 operates at a much slower r.p.m. and forward travel of the swing arm outer end is reduced to around 0.5 miles per hour in anticipation of stopping travel.

Arc travel of the swing arm outer end 23 continues at the slow speed forward rate until a detector arm of a tripswitch 137 mounted to the swing arm outer end 23 engages a horizontal trip bar 136 (FIG. 1). The trip switch 137 signals programmable controller 160 to switch five position switch 172 to the stop position. Subsequently the drive motor 47 stops operating. When drive motor 47 stops operating, the swing arm outer end 23 also stops. The swing arm outer end 23 is now positioned so that the top rim of the access valve body 97 of access valve 12b is inside the circumference of alignment cone 85. The alignment cone 85 may be lowered to act against the rim of the valve body 97 in order to align the coupler body 24 with the access valve 12b.

The distance between access valve 12a and access valve 12b may typically be 127 feet as is the distance between any two successive access valves 12 along water main 11. This distance is equal to three connected lengths of commonly available 42 foot long plastic mainline pipe plus the width of an access valve 12. Sixty feet is a standard distance between the access valves for conventional automated connector lateral move irrigators.

The valve coupling means 19 is now positioned similar to the position shown in FIGS. 1 and 2, and the connector means 18 and water delivery pipe means 15 are positioned as shown in FIG. 9D. Programmable controller 160 switches hydraulic valve 168 from the down position to the up position and activates the main water valve 54 to open. The up switched hydraulic valve 168 connects hydraulic cylinders 45 to the intake side of hydraulic pressure means 169 causing hydraulic cylinders 45 to retract and subsequently causing transport frame 46 with transport wheels 21 to be pivoted upward. The upward pivoting frame and transport wheels 21 cause the valve coupling means 19 to move down on top of access valve 12b in order to align with, connect to, and then force open access valve 12b.

When hydraulic cylinders 45 are completely retracted as shown in FIG. 3, support wheels 27 contact the ground to support the swing arm outer end 23. Transport wheels 21 have been lifted off the ground surface and the valve 12b has been opened. Water flow from the opened access valve 12b is detected by pressure sensor 155 which signals programmable controller 160. In response, controller 160 initiates forward travel and subsequent water application by the water delivery pipe means 15. Initially, controller 160 may operate swing arm length regulating means 30, according to logic means 170, to reorient regulating means 30 back to the position which preceded the disconnection of coupler body 24 from access valve 12a. Alignment with access valve 12b will have altered the position of the swing arm length regulating means 30 and resetting the regulating means 30 to its forementioned position acts to compensate for the margin of error associated with the delivery pipe positioning means (FIG. 12) which includes the forementioned cyclometer means 130, pivot angle measuring means 104, and control means 150.

Connector means 18 and water delivery pipe means 15 have now in effect been controlled to operate for one complete cycle of forward travel. Further forward travel and subsequent application of water will result by repeating the previously described operational procedure. Successive repetitions of the forementioned operational procedure correlating with each successive connection to an access valve 12 along the water main 11, enables the water delivery pipe means 15 to traverse and apply water across a field.

Programmable controller 160 functions to count each connection to an access valve 12 from the first connection to an access valve 12c as shown in FIG. 10A until the last connection to an access valve 12d as shown in FIG. 10B. Connection to access valve 12d will initiate the operation of the delivery pipe rotation means 103 according to the counting of the access valves 12 by programmable controller 160 with reference to the actual number of access valves installed as stored by logic means 170. This second operational procedure is for the purpose of rotating the water delivery pipe means 15 substantially 180 degrees, about the connection to access valve 12d, from its current position in a Field A (FIG. 10B) that is adjacent to one side of the water main 11, to a similar perpendicular orientation on the opposite side of the water main 11. Consequently, after a completed operation of the water delivery pipe rotation means 103, the water delivery pipe means 15 and connector means 18 will reside in a second field; Field B (FIG. 10C).

Operation of the water delivery pipe rotation means 103 begins in the same manner as the operation of the connector means 18. With access valve 166 opened, water flows from water main 11 to be applied onto the ground surface. Water pressure is detected by water pressure sensor 155 which signals programmable controller 160. Programmable controller 160 activates percentage timer 156 in order to start forward travel of the water delivery pipe means 15. Forward travel of the water delivery pipe means continues until the swing arm means 16 and the water delivery pipe means 15 are longitudinally aligned as illustrated in FIG. 9B.

The signal from cyclometer rotation register 135 indicates to programmable controller 160 that water delivery pipe means 15 is substantially longitudinally aligned with the swing arm means 16 as shown. In response, programmable controller 160 begins the operational procedure that is unique to the water delivery pipe rotation means 103, by switching the percentage timer 156 to a special position, turning on a motor brake 171, switching the main water valve 54 closed and opening a series of electrically actuated line drains 200. Percentage timer 156 has six operational positions. (The six operational positions are unique to the present invention. The percentage timer itself is a conventional component.) Four of the positions are for use during operation of the connector means 18 including a position dictating forward travel and a position dictating reverse travel. The speed of forward and reverse travels depends on the manually determined setting of the percentage timer 156. The remaining two setting positions utilized during operation of the connector means 18 include a double speed forward position and a double speed reverse position. (These double speed positions are utilized as part of a means for irrigating corners described later.) Each double speed position serves to operate the appropriate drive motors at twice the speed as manually set on percentage timer 156. The remaining two operational positions of percentage timer 156 are for use during operation of the delivery pipe rotation means 103 including a position dictating forward travel and a position dictating reverse travel. Both forward and reverse positions employ a fixed travel speed equivalent to a 50 percent setting on the percentage timer 156.

Programmable controller 160 begins operation of the delivery pipe rotation means 103 and switches percentage timer 156 to the position for fixed speed reverse operation of drive motors 152 and 157. Consequently, movable carts 14a and 14b begin travel in a reverse direction and are traveling simultaneously about half of the time. Percentage timer 156 operates drive motors 152 and 157 simultaneously as previously practiced during operation of the connector means 18. However, because the water delivery pipe means 15 is now rotating and the drive motors 152 and 157 are set to power their respective movable carts 14a and 14b at the same speed as part of the connector means 18, movable cart 14b lags behind. Consequently, when percentage timer 156 intermittently shuts off drive motors 152 and 157, programmable controller 160 will utilize an available procedure from the operation of the connector means 18. Controller 160 will analyze the signal from pivot angle recorder 120 in order to operate drive motor 157 for powering movable cart 14b. Controller 160 discontinues power to drive motor 157 when first span 13a is once again longitudinally aligned with the swing arm supply pipe 36 as determined by pivot angle recorder 120.

The remaining movable carts 14 along the water delivery pipe means 15 remain longitudinally aligned with the first span 13a during operation of the delivery pipe rotation means 103 by utilizing the same conventional means of alignment as utilized for that purpose during operation of the connector means 18. However, in order to remain aligned, the movable carts 14 must travel increasingly faster the farther they are from the swing arm outer end 23. This may be accommodated by progressively increasing the horsepower size of the drive motors and decreasing the gear ratios of the associated gear reducers for the movable carts 14 as the distance increases from the swing arm outer end 23. This arrangement enables progressively increased travel speed for the movable carts 14 from a minimum cart speed at the swing arm outer end 23 to a maximum cart speed at the remote end of the water delivery pipe means 15, as required for proper operation of the water delivery pipe rotation means 103. The successively increased travel speed of the movable carts 14 complies with the requirements for slowly moving the water delivery pipe means 15 forward during irrigation and for maintaining the proper water delivery pipe alignment during said forward travel. Maintaining this alignment requires only the occasional operation of the drive motors in response to a detected misalignment.

At the onset of operating the delivery pipe rotation means, programmable controller 160 activates the motor brake 171. Brake 171 locks the electric motor 34 and subsequently locks the swing arm length regulating means 30 in the retracted position as shown in FIG. 4. Movable carts 14 will now travel along established paths and will not wander during rotation of the water delivery pipe means 15. Programmable controller 160 also closes the main water valve 54 in order to discontinue water application during operation of the delivery pipe rotation means 103. In addition, controller 160 has opened a series of electrically actuated line drains 200 (FIG. 14A) mounted along the length of the water delivery pipe means 15 in order to drain the water delivery pipes 202 so as to lighten the traveling load.

Operation of the delivery pipe rotation means 103 is continued, until the water delivery pipe means 15 and swing arm means 16 reach a position as shown in FIG. 10C. There the arm of a tripswitch 180 (FIG. 8B) contacts a ground anchored rod 181 positioned adjacent to the circular travel path of movable cart 14a. The tripswitch 180 signals programmable controller 160 indicating that operation of the delivery pipe rotation means 103 may be discontinued. Subsequently the connector means 18 may once again be operated.

As shown in FIG. 10C, the delivery pipe rotates in a reverse direction in relation to the previous forward linear travel of the delivery pipe means 15. In some cases, it may be advantageous to rotate the water delivery pipe means 15 in the forward direction. Controller 160 would then switch the percentage timer 156 to the fixed speed forward travel position. Consequently, operation of the delivery pipe rotation means 103 would result in the water delivery pipe means 15 rotating beyond Fields A and B in order to achieve the necessary position to begin operation of the connector means 18 and subsequent irrigation of Field B.

Programmable controller 160 reinstates the connector means 18 by turning off the motor brake 171, by switching percentage timer 156 back to the manually adjustable forward travel position, by switching the main water valve 54 to be opened and by closing the electric line drains 200.

Water delivery pipe means 15 may now begin forward travel. The water delivery pipe means 15 travels from the starting position as shown in FIG. 10C until the unit arrives at a position similar to that shown in FIG. 9C utilizing the same operational procedure as previously described for moving the water delivery pipe means 15 and connector means 18 from the position shown in FIG. 9B to the position shown in FIG. 9C. The travel means 22 and valve coupling means 19 are now operated by controller 160 in order to forward the connection to the next access valve 12 as shown in FIG. 9D.

Water delivery pipe means 15 travels forward in conjunction with the repetative operation of the connector means 18; each repetition corresponding with each successive disconnection from an access valve 12. Travel transpires from the position at one end of the series of access valves 12 as shown in FIG. 10C to the position at the other end of the series of access valves 12 as shown in FIG. 10D. Once again, programmable controller 160 counts the number of connections made along the series of access valves 12 in order to detect the last access valve 12 along this side of water main 11. The last access valve 12 available for connection during the irrigation of Field B is access valve 12c. Access valve 12c was the first access valve 12 to be connected to and opened at the onset of the irrigation process when the water delivery pipe means 15 began forward travel to irrigate Field A as shown in the forementioned position in FIG. 10A.

From the position shown in FIG. 10D, the swing arm means 16 and water delivery pipe means 15 may be rotated substantially 180 degrees about the connection to access valve 12c to the position shown in FIG. 10A. The delivery pipe rotation means 103 is again operated by programmable controller 160 according to the same operational procedure employed for rotating the swing arm means 16 and water delivery pipe means 15 from the position shown in FIG. 10B to the position shown in FIG. 10C. Operation of delivery pipe rotation means 103 is terminated when the arm of tripswitch 180 contacts another appropriately positioned ground anchored rod 181. Actuation of tripswitch 180 signals programmable controller 160, which in response, discontinues operation of the water delivery pipe rotation means 103 and resumes operation of the connector means 18.

Both Field A and Field B have now been irrigated and the water delivery pipe means 15 is positioned to begin a second irrigation of Field A. The circuitous nature of the path traveled by the water delivery pipe means 15 of the present invention presents a distinct advantage over the travel path of suggested automated irrigation approaches including present commercially available approaches. Irrigation of a field with present commercially available automated lateral move irrigators leaves the water delivery pipe the full length of the field away from the original staring position. Presently available automated lateral move irrigators must then be rolled dry or while irrigating, backwards across the field.

The distance traveled and the area covered by the present system of rotating the water delivery pipe means between fields and back to the original starting position, is superior to the commercially available approaches.

The most dramatic advantage of the present invention also emerges from the circuitous nature of the path traveled by the water delivery pipe means. Any field to be irrigated by presently available automated lateral move irrigators may now be irrigated with a water delivery pipe means 15 that is only one half of the previous required pipe length. In addition, the number of access valves installed for operation of the present invention will typically be half that required with prior commercially available systems.

Typically, all common day lateral move irrigators require a guide wire stretched along the travel path. The guide wire may be eliminated with the present invention. All advantages considered, the present invention represents an automated irrigation system that is considerably less expensive and drastically less complicated than those presently available.

When the coupling means 19 is transported between access valves 12 (FIG. 9D) and when the delivery pipe rotation means 103 is operated (FIGS. 10C and 10A), water flow through the water delivery pipe means 15 has been discontinued. In many instances it is preferable to keep the pump operating by temporarily diverting the water flow rather than shutting off the pump. Two approaches for diverting water are diagramatically illustrated in FIGS. 13A and 13B.

The simplest approach towards temporarily diverting water from the water main 11 is shown in FIG. 13A. A mainline diverter valve 185 is hydraulically connected somewhere along the water main 11 typically near one of its ends. Mainline diverter valve 185 is operated to open in response to a signal from a mainline pressure sensor 186. Mainline pressure sensor 186 monitors the pressure in the water main 11. When water flow through the water delivery pipe means 15 has been discontinued, the pressure in water main 11 rises dramatically as the pump continues to operate. Mainline pressure sensor 186 detects the obvious pressure rise and responds by signaling the mainline diverter valve 185 to be opened. When the mainline diverter valve 185 is opened, the pressurized water from water main 11 flows into a gravity applicator pipe 187. Gravity applicator pipe 187 may be a common piece of pipe running from the mainline diverter valve 185 along the elevationally high side of a comparatively small irregular shaped field in the vicinity of the much larger Fields A and B as shown in FIGS. 10A-10D. Gravity applicator pipe 187 includes spaced outlet holes along its length which allow the intermittently supplied water to flow freely from the holes and into adjacent furrows extending out and downward into the adjacent small field. Utilizing a gravity applicator pipe is common to the industry of gravity fed irrigation systems.

If a small irregular shaped field may not be accessed in the vicinity of the much larger Field A and Field B or it is desirable to more effectively apply the diverted water, then a second approach may be incorporated as illustrated in FIG. 13B. This optional approach utilizes the forementioned mainline diverter valve 185 and the mainline pressure sensor 186. However, mainline diverter valve 185 diverts water from water main 11 into a reservoir 188 instead of gravity applicator pipe 187. When water is once again allowed to flow through water delivery pipe means 15 and subsequently mainline diverter valve 185 closes, the water filled reservoir may be emptied back into the water main 11 by operating an auxiliary pump 190. Typically, auxiliary pump 190 operates continuously until a float switch 189 actuates when the reservoir has been emptied and signals to stop the operation of auxiliary pump 190. Float switch 189 may function as a precautionary device and actuate when the reservoir is full and signal to stop the operation of the main pump 184. Float switch 189 will also detect a full reservoir and signal to stop operation of main pump 184 when the water delivery pipe rotation means is operating.

It is advantageous to expedite the operations of the present system which require the water flow through the water delivery pipe means 15 to be discontinued. As described, these operations include transporting the valve coupling means 19 between access valves 12 and operating the delivery pipe rotation means 103. As mentioned, these operations may be completed as quickly as the associated structures will allow. This serves to reduce the amount of time water is not flowing through the water delivery pipe means 15 and subsequently the time that water may need to be diverted from the water main 11. Typically, operation of the connector means 18 and operation of the delivery pipe rotation means 103 will constitute a combined time of between one and ten percent of the time water flows through the water delivery pipe means 15, depending in part on how fast the water delivery pipe means 15 is traveling while applying water.

The present system may also be operated along a series of spaced access valves 12 mounted to a water main 11 as shown in FIG. 11. The water main 11 may elbow at a right angle in order to irrigate an L-shaped field.

Operation of the present system to irrigate an L-shaped field, or to irrigate any of a miriad of multi-shaped fields, is possible by utilizing the same group of previously described controls (FIG. 12). The present system is able to irrigate an L-shaped field through its ability to accommodate multiple 90 degree elbows to the right or left and by its ability to modify the direction of forward travel of the water delivery pipe means 15 by any angle. However, 90 degree changes in travel direction will result in perfectly uniform coverage. Changes in travel direction other than 90 degrees will erode the uniformity of coverage.

Describing the procedure of operation for irrigating an L-shaped field may begin with the water delivery pipe means 15 traversing a field in conjunction with the typical operation of the connector means 18 until connection is made to an access valve 12e. Once again, programmable controller 160 has counted the connections made to each access valve 12 along water main 11 while referring to logic means 170 and subsequently has distinguished access valve 12e. Once valve 12e is detected, programmable controller 160 switches percentage timer 156 to the doubled speed manually set forward position. The water delivery pipe means 15 and connector means 18 continue forward operation in the usual manner except now the water delivery pipe means 15 is traveling at twice the previous speed and so is applying one half the amount of water.

Forward travel of the water delivery pipe means 15 and connector means 18 continues at a doubled rate as access valves 12 are successively connected in the usual manner until connection is finally made to an end access valve 12f. (Typically the distance between access valve 12e and access valve 12f will be similar to the distance from the swing arm outer end 23 to the remote end of the water delivery pipe means 15.) After connection to access valve 12f, forward travel continues until the forward position where disconnection from the valve would normally be expected during standard operation of the connector means 18. Instead of disconnecting from access valve 12f, controller 160 switches percentage timer 156 to the double speed reverse position. Irrigation continues as the water delivery pipe means 15 backtracks along the series of access valves 12 at double the manually set speed until the connection again to access valve 12e has been counted by controller 160. Backward travel will continue after connection has again been made to access valve 12e until the swing arm means 16 becomes longitudinally aligned with the water delivery pipe means 15. Irrigation of the outside corner section of the L-shape has now been completed.

When water delivery pipe means 15 and swing arm means 16 attain longitudinal alignment, the delivery pipe rotation means 103 may be operated by controller 160 as previously described. In this case the percentage timer 156 is switched to the non-adjustable forward travel position. Forward rotation of the water delivery pipe means 15 transpires until discontinuance is prescribed as in the usual manner when a ground anchored rod 181 is encountered by the arm of tripswitch 180 (FIG. 8B).

Water delivery pipe means 15 has been rotated 90 degrees and may now proceed with forward travel in the usual manner with the percentage timer 156 set at the manually set forward travel position. Typical operation of the connector means 18 continues while the water delivery pipe means 15 travels forward until a last access valve 12 is connected to and subsequently counted by controller 160. Controller 160 acts accordingly and operates the delivery pipe rotation means 103 in the usual manner in order to rotate the water delivery pipe means 15 to the opposite side of the water main 11.

Controller 160 reinstates operation of the connector means 18 and forward irrigation is continued along this side of the water main 11 until controller 160 recognizes an access valve 12g from logic means 170. Controller 160 switches percentage timer 156 to the double speed forward travel position. Forward travel of the water delivery pipe means 15 then continues at double speed until connection is made to access valve 12h. (Access valve 12h is also the forementioned access valve 12e.) Again, travel continues on until the swing arm 16 and water delivery pipe means 15 are longitudinally aligned. At this point the delivery pipe rotation means 103 is operated with the percentage timer 156 switched to the fixed-speed reverse travel position. Reverse rotation of the water delivery pipe means 15 commences and will continue through a 90 degree angle until discontinued in the usual manner when tripswitch 180 is actuated by a ground anchored rod 181.

The actuated tripswitch 180 instructs controller 160 to reinstate operation of the connector means 18 with the percentage timer 156 in the double speed manually adjustable forward travel position. Double speed forward travel of the water delivery pipe means 15 will commence and continue until connection is made to an access valve 12i. Connection to access valve 12i indicates that the irrigation of the inside of the corner has been completed.

Controller 160 recognizes access valve 12i from logic means 170 and accordingly switches percentage timer 156 back to the standard speed manually adjusted forward travel position so that the remainder of the field may be irrigated in the standard fashion.

Together, the present connector means 18 and delivery pipe rotation means 103 present a distinctly superior automated lateral move irrigation system and present a superior automated irrigation system for irrigating irregular shapes.

The water delivery pipe means 15 of the present system may incorporate the forementioned water applicator means 143 for applying water from the water delivery pipes 13 onto the ground surface.

Water applicator means 143 may include any conventional means for applying the water from the water delivery pipes 13 onto the field surface. However, for irrigating fields with soil that absorbs the applied water at a relatively slow rate, it becomes increasingly advantageous to utilize the present rotatable discharge boom means 77 for applying the water from water delivery pipes 212 onto the field surface.

The advantages of rotatable discharge boom means 77 may be understood with reference to FIGS. 16A, 16B, and 17. (The examples illustrated in FIGS. 16A, 16B, and 17 represent a water delivery pipe means 15 advantageously about 1300 feet long including seven trussed delivery pipes 13 each about 160 feet long and also including eight movable carts 14 with a rotatable boom means 77 mounted atop each movable cart 14. Water delivery pipe means 15 for use with the present invention may range in length from 160 feet to 2600 feet.) FIG. 16A represents the typical throw diameter and thus width of coverage offered by conventional sprinklers mounted along a given length of water delivery pipe means. Conventional means of applying water include impact sprinklers and spray nozzles. All of the conventional applicator means discharge water from 30 feet, with the operation of low pressure spray nozzles, to 60 feet with the operation of high pressure impact sprinklers. (Low pressure operation is generally most desirable when soil absorption rates will permit.) FIG. 16A illustrates a throw distance of 60 feet and thus a throw diameter of 120.

A water delivery pipe means 15 utilizing rotatable discharge boom means 77 as shown in detail in FIG. 14A and diagrammatically in FIGS. 16B and 17 enables the applied water to be distributed over a much greater area than the conventional applicators of FIG. 16A for a given length of water delivery pipe means. FIG. 16B illustrates a typically available throw diameter and thus width of coverage when water is discharged unrestricted from a single end nozzle 87 on each boom means 77. (An example in FIGS. 16B and 17 represent a water flow rate through each rotatable boom means 77 of around 400 gallons per minute; around 200 gallons per minute discharged out of end nozzle 87 and the other 200 gallons per minute out of the series of discharge nozzles 84. Rotatable booms 77 are most advantageous in the flow range from 100 to 500 gallons per minute.) The throw diameter shown in FIG. 16B is so great due to the length of the rotatable discharge booms 60 that end nozzles 87 may typically include means to retard the available throw distance in order to afford low pressure operation with excellent water droplet quality and excellent wind control. For instance, the available throw distance may be retarded from the 100 foot throw shown in FIG. 16B to a 50 foot throw shown in FIG. 77. The retarded end throw as shown in FIG. 17 may represent a 220 foot throw diameter for each discharge boom means 77, which generates a width of coverage almost twice as wide as the widest width of coverage typically available with the conventional applicators as shown in FIG. 16A.

Width of coverage along a delivery pipe means is directly proportional to the amount of land a given length of water delivery pipe means is capable of irrigating, providing that the soil absorption rate is a limiting factor. Consequently, a given length of water delivery pipe means 15, incorporating the rotatable water discharge boom means 77, will be capable of traversing and subsequently irrigating two to three times the amount of land capable with the same given length of water delivery pipe means 15 employing conventional means of applying water.

The rotatable discharge boom means 77 mounted atop the movable carts 14 of a water delivery pipe means 15 (FIG. 14A) in combination with any means of connection along the water main 11, may include two operational modes.

The first operational mode of rotatable discharge boom means 77 is employed when a water delivery pipe means is traveling and subsequently irrigating a field. The water delivery pipe means 15 of the present invention may travel from a position similar to that shown in FIG. 10A, at one end of a field, to a position similar to that shown in FIG. 10B, at the opposite end of said field and likewise when the water delivery pipe means 15 travels between positions similar to those shown in FIGS. 10C and 10D. As a lateral move water delivery pipe means 15 traverses a field, the amount of water applied to the ground surface by a series of rotatable discharge boom means 77, each rotating at a constant speed, will vary depending upon the position of the point of application along the length of the water delivery pipe. The fully retarded throw of end nozzle 87 as shown in FIG. 17 presents the greatest display of varied time water is applied to the ground surface and thus the worst coverage uniformity. (Sprinkler overlaps serve to help even the water distribution for conventional applicator means and the rotatable boom means 77 shown in FIG. 16B.) In order to attain the maximum uniformity of coverage as exemplified in FIG. 17, it is advantageous to selectively vary the rotation speed of each boom means 77 during each rotation and subsequent rotations. This practice has been discussed in U.S. Pat. No. 4,522,338 which is incorporated herein by reference.

When the outer end of the water throw from end nozzle 87 is in a region where the series of discharge boom means 77 would, with constant rotation speeds, spend less time applying water and thus apply less than the average amount of water, the rotation speed of the rotatable boom means 77 is slowed. (The amount of water discharged from the discharge boom 60 of each boom assembly 77 will be proportionally increased approaching the outer region of water application so that the rate per hour that water is applied to the ground surface by each discharge boom 60 will be constant. Consequently, the outermost throw of water discharged from end nozzle 87 will constitute the greatest concentration of water and varying the rotation speed of boom assembly 77 in response to the position of the outermost end throw will have the greatest effect on the amount of water applied.) The graph shown in FIG. 17 exemplifies a variation of rotation speeds for a series of rotatable discharge boom means 77 mounted along a water delivery pipe means 15. Certain regions will have water applied by the discharge booms 60 of two adjacent discharge boom means 77. Consequently, the proportional time water is applied may be greater in these regions and, as the graph illustrates, the speed of rotation is increased when the extreme of a particular end throw applies water in that region. (Because there is symmetry to the application needs on each side of a boom rotation axis along the delivery pipe length, rotatable boom means 77 with two discharge booms as shown in FIG. 14B may be rotation speed controlled resulting in uniform coverage.)

A second operational mode may be employed when the water delivery pipe means 15 is positioned to begin irrigation of a field as shown in FIGS. 10A and 10C or when the water delivery pipe means 15 has completed irrigation of a field as shown in FIGS. 10B and 10D. In all cases, the water delivery pipe means 15 remains stationary with water flowing while the rotational speed of each discharge boom assembly 77 is varied in order to accommodate the regions which will not be completely traversed by the water delivery pipe means 15.

In other words, the region from the front edge of the width of coverage, (the front edge is the edge the water delivery pipe will be traveling toward,) to the rear edge of the width of coverage, (the rear edge in this case will typically be the boundary of the field), will receive proportionally less water applied as a water delivery pipe means 15 with conventional water applicator means 143 begins to traverse a field from the positions as shown in FIGS. 10A and 10C. To rectify this inadequacy, the rotation speed of the rotatable boom means 77 as shown in FIG. 14A may be proportionally slowed as the outermost throw from end nozzle 87 approaches the rearmost region. The water delivery pipe means will remain stationary while applying water from the rotatable boom means 77 for an amount of time proportional to the manually prescribed setting on percentage timer 156. Upon completion of the established time period, controller 160 initiates forward travel of the water delivery pipe means 15 and subsequently switches rotatable discharge boom operation to the forementioned first operational mode.

When the water delivery pipe means 15 has completed an irrigation across a field as shown in FIGS. 10B and 10D, the region of the width of coverage for the water applicator means to the front of the water delivery pipe means 15 has received proportionally less water applied, (in this case the front edge will typically be the boundary of the field). Here again, the water delivery pipe means 15 remains stationary for a time period proportional to the setting on percentage timer 156 while the rotatable boom means 77 continue to apply water. In this case, the rotational speed of each rotatable discharge boom means 77 is proportionally slowed approaching the front of the water delivery pipe means.

An alternate embodiment of a rotatable boom means 77 is shown in FIG. 14B. As described earlier, an extra discharge boom 125, substantially identical to discharge boom 60, extends in the opposite direction as the boom 60 shown in FIG. 14A. The two discharge booms shown may be rotated about a common axis to reduce the water available for discharge from end nozzle 87 and consequently reduce the ability to throw the water as far. Multiple booms thus reduce the ability to spread out the applied water. However, because the length of the rotatable discharge booms serve to greatly spread the applied water, multiple discharge booms still represent an advantageous practice. Boom assemblies 77 with more than two discharge booms do not afford the application symmetry required to utilize varied rotation speed in order to provide uniform coverage. Additionally, the discharge boom means 77 shown in FIG. 14B as well as boom means with multiple discharge booms are not capable of practicing the application capability of the forementioned second operational mode.

Discharge boom means 77 may advantageously be employed on water delivery pipe means of center pivot irrigators. Center pivot irrigators utilize a water delivery pipe means substantially identical in structure to that of lateral move water delivery pipe means. Center pivot delivery pipes are controlled to rotate about a permanent connection to the water supply located at one end of the water delivery pipe. Consequently, water application amounts per hour increase approaching the delivery pipe end remote from the center pivot. A series of discharge boom means 77 may be mounted along the outer end of a center pivot delivery pipe to spread out the applied water and thus to reduce the high application rate at the outer end of a center pivot delivery pipe. Because center pivot delivery pipes require increased application amounts toward the outer end, only discharge boom means 77 with one discharge boom as shown in FIG. 14A are able to employ variation of rotation speed in order to achieve uniform coverage.

A rotation speed control means 145 (FIG. 12) includes a drive motor 59. Motor 59 drives rubber wheel 208 against ring 64 (FIG. 8B) causing the rotatable discharge means 77 to rotate. Position of rotation is monitored by indexer 82. Controller 160 interprets the signal from indexer 82 and refers to logic means 170 in order to determine what the speed of motor 59 should be at the current position of rotation. Controller 160 responds by varying the speed of motor 59 accordingly.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. An agricultural irrigation system for operation along an elongated pressurized water main having sections of land adjacent to opposite sides thereof, said water main including spaced, normally closed, access valves, the irrigation system comprising:
    a length of water delivery adapted to extend substantially perpendicular to the water main;
    a plurality of cart means supporting the length of water delivery pipe for movement along the ground surface in a forward direction of travel;
    drive means on said cart means for moving the cart means and water delivery pipe substantially transverse to the delivery pipe length;
    water applicator means located along the delivery pipe length for selective water application therefrom;
    water delivery pipe rotation means for selectively controlling the drive means to rotate the length of water delivery pipe to a position along said water main from one side thereof to an opposite side thereof so that the same length of water delivery pipe may irrigate two sections of land;
    connector means on the water delivery pipe for selectively connecting the delivery pipe to and opening the normally closed access valves, said connector means further comprising:
    valve coupling means on the delivery pipe for selective engagement with the individual access valves to open the valves such that water is delivered therefrom through the delivery pipe,
    swing arm means having a free swinging end mounting said valve coupling means and a remaining end attached to one end of the traveling water delivery pipe for guided transport of the coupling means between access valves,
    pivot means mounting the swing arm means to the water delivery pipe for angular movement relative thereto,
    valve coupling travel means for supporting and moving the free swinging end of the swing arm means so as to transport the valve coupling means between valves,
    valve coupler rotation means for allowing horizontal rotation of the swing arm means when connection is made to an access valve and the remaining swing arm end is carried forward by the delivery pipe,
    delivery pipe positioning means for maintaining the delivery pipe directionally aligned with the main during forward travel of the delivery pipe and subsequent water application,
    control means associated with the valve coupling means, valve coupling travel means, and delivery pipe positioning means for controlling the uncoupling, travel, and coupling of the valve coupling means along the series of access valves.

2. The irrigation system as claimed by claim 1 wherein the swing arm means includes a length regulating means to vary the distance between the valve coupling means and the pivot means.

3. The irrigation system as claimed in claim 1 wherein the valve coupling means includes an alignment means to allow horizontal travel of the valve coupling means for alignment with an access valve.

4. The irrigation system as claimed by claim 1 wherein the valve coupling means includes an actuator means to allow vertical travel of the coupling means to force open an access valve.

5. The irrigation system as claimed by claim 3 wherein the alignment means includes a guide means attached to the valve coupling means for acting against the access valve facilitating alignment between the coupling means and the access valve preceeding connection to the access valve.

6. The irrigation system as claimed by claim 1 wherein the swing arm means includes a truss supported conduit span located between the pivot means and the valve coupling means.

7. The irrigation system as claimed by claim 1 wherein the valve coupler rotation means includes a ground support means with wheels whose axes are substantially perpendicular to the swing arm length for pivotable support of the swing arm end and the valve coupling means.

8. The irrigation system as claimed by claim 1 wherein the delivery pipe positioning means includes a pivot angle measuring means to measure the pivot angle between the swing arm and the water delivery pipe.

9. The irrigation system as claimed by claim 1 wherein the delivery pipe positioning means includes a cyclometer means for measuring the distance traveled by the water delivery pipe.

10. The irrigation system as claimed by claim 2 wherein the control means includes a swing arm length measuring means to monitor the relative distance between the valve coupling means and the pivot means.

11. The irrigation system as claimed by claim 1 wherein the control means includes logic means relative to a pivot angle measuring means, cyclometer means, and swing arm length measuring means for prescribing the orientation between the delivery pipe and the water main.

12. The irrigation system as claimed by claim 1 wherein the water delivery pipe rotation means is integral with the valve coupler rotation means for pivoting the delivery pipe about an access valve from one side of the water main to an opposite side thereof.

13. The actuator means as claimed by claim 4 wherein the access valves are openable by application of downward force and wherein the swing arm means and coupling means contribute to a sufficient weight for opening the access valves.

14. For use with a land irrigation system including a series of access valves spaced along a water main and a water delivery pipe mounted by carts for travel transverse to the delivery pipe length; an apparatus to successively forward an access valve coupler along the series of access valves in relation to travel of the water delivery pipe comprising:
   valve coupling means for selectively connecting the water delivery pipe to the individual access valves,
   a swing arm mounted to the water delivery pipe and extending therefrom to a free swinging end supporting the valve coupling means for guided transport of the valve coupling means between access valves and for flowing water between the valve coupling means and the delivery pipe,
   pivot means for pivotably mounting the swing arm to the water delivery pipe,
   travel means for ground supporting and moving the free swinging end of the swing arm,
   valve coupler rotation means for allowing rotation of the swing arm when the free swinging end is secured by the valve coupling means to an access valve,
   swing arm length regulating means for adjusting the length of the swing arm when the swing arm rotates,
   control means operative responsive to the valve coupling means, and travel means for controlling the uncoupling, travel, and recoupling of the valve coupling means along the series of access valves.

15. The apparatus as claimed by claim 14 wherein the valve coupler rotation means includes a ground support means for pivotably supporting the swing arm outer end and the valve coupling means when the valve coupling means has engaged an access valve.

16. For use with a land irrigation system including a series of access valves spaced along a water main and a water delivery pipe mounted by carts for travel transverse to the delivery pipe length; an apparatus to successively forward an access valve coupler along the series of access valves in relation to travel of the water delivery pipe comprising:
   valve coupling means for selectively connecting the water delivery pipe to the individual access valves,
   swing arm means mounted to the water delivery pipe and extending therefrom to a free swinging end supporting the valve coupling means for guided transport of the valve coupling means between access valves and for flowing water between the valve coupling means and the delivery pipe,
   pivot means for pivotable mounting the swing arm means to the water delivery pipe,
   travel means for ground supporting and moving the free swinging end of the swing arm means,
   valve coupler rotation means for allowing rotation of the swing arm means when the free swinging end is secured by the valve coupling means to an access valve,
   control means operative responsive to the valve coupling means, pivot means and travel means for controlling the uncoupling, travel and recoupling of the valve coupling means along the series of access valves, wherein the control means further comprises:
   a pivot angle measuring means to measure the pivot angle between the swing arm means and the water delivery pipe.

17. For use with a land irrigation system including a series of access valves spaced along a water main and a water delivery pipe mounted by carts for travel transverse to the delivery pipe length; an apparatus to successively forward an access valve coupler along the series of access valves in relation to travel of the water delivery pipe comprising:
   valve coupling means for successively connecting the water delivery pipe to the individual access valve,
   swing arm means mounted to the delivery pipe and extending therefrom to a free swinging end supporting the valve coupling means for guided transport of the valve coupling means between access valves and for flowing water between the valve coupling means and the delivery pipe,
   pivot means for pivotably mounting the swing arm means to the water delivery pipe,
   travel means for ground supporting and moving the free swinging end of the swing arm means,
   swing arm length regulating means for adjusting the distance between the valve coupling means and the pivot means,
   valve coupling rotation means for allowing rotation of the swing arm means when the free swinging end is secured by the valve coupling means to an access valve,
   control means operative responsive to the valve coupling means, travel means, and swing arm length regulating means for controlling the uncoupling, travel and recoupling of the valve coupling means along the series of access valves, wherein the control means further comprises:

a swing arm length measuring means to monitor the relative distance between the coupling means and the pivot means.

18. The apparatus as claimed by claim 14 wherein the valve coupling means includes an actuator means which utilizes the available weight of the swing arm and valve coupling means to downwardly force open the access valves.

19. In the operation of a land irrigation system including a series of access valves spaced along a water main and an elongated water delivery pipe mounted by carts for travel in a direction transverse to the delivery pipe length and adjacent to the series of access valves; a method of successively connecting the series of access valves in response to forward travel of the delivery pipe with said method providing to regulate the distance between the water main and the elongated delivery pipe during said forward travel and said new method also providing to maintain an alignment between the elongated delivery pipe and the series of access valves, comprising the steps of:
  engaging a valve coupler to a water main access valve for establishing water flow from the access valve to the water delivery pipe,
  moving the water delivery pipe for applying water across the land,
  pivoting a swing arm about a coupler mounted end coupled to a stationary access valve by pivotably connecting the other end of said swing arm to the traveling water delivery pipe for maintaining water flow when the delivery pipe travels,
  disengaging the valve coupler from the water main access valve for discontinuing water flow and for releasing the coupler mounted end of the swing arm,
  arcing the coupler mounted end of the swing arm along the ground about the other end of the swing arm for carrying the valve coupler between successive access valves and consequently forwarding connection on of the water delivery pipe along the series of access valves,
  monitoring the geographic position of the swing arm relative to the water main and the forward travel of the delivery pipe and in response controlling the directional alignment between the delivery pipe and the water main.

20. The method as claimed by claim 19 wherein the step of monitoring the geographic position of the swing arm further includes varying the distance along the swing arm between the valve coupler and the pivot proportional to the forward traveling delivery pipe for guiding the water delivery pipe during travel in the forward direction 21. The method as claimed by claim 19 wherein the step of engaging a valve coupler further involves aligning the valve coupler to the access valve before opening said valve.

22. The method as claimed by claim 19 wherein the step of engaging a valve coupler further involves downwardly forcing open an access valve utilizing available weight including that of the swing arm and valve coupler.

23. The method as claimed by claim 19 wherein the step of arcing the coupler mounted end of the swing arm further involves supporting a pipe length between the valve coupler and the water delivery pipe.

24. The method as claimed by claim 19 wherein the step of pivoting a swing arm about a coupler mounted end connected to an access valve further involves ground supporting the coupler mounted swing arm end with wheels whose axes are substantially perpendicular to the swing arm length.

25. The method as claimed by claim 19 wherein the step of monitoring the geographic position of the swing arm relative to the water main and the forward travel of the delivery pipe further involves monitoring the pivot angle between the swing arm and the water delivery pipe.

26. The method as claimed by claim 19 wherein the step of monitoring the geographic position of the swing arm relative to the water main and the forward traveling delivery pipe further involves determining the angular alignment between the swing arm and the water main.

27. For use with a land irrigation system including a series of access valves spaced along a water main and a water delivery pipe mounted by carts for travel transverse to the delivery pipe length; an apparatus to successively forward an access valve coupler along the series of access valves in relation to travel of the water delivery pipe comprising:
  valve coupling means for selectively connecting the water delivery pipe to the individual access valves,
  a truss supported conduit span mounted to the water delivery pipe and extending therefrom to a free swinging end supporting the valve coupling means for guided transport of the valve coupling means between access valves and for flowing water between the valve coupling means and the delivery pipe,
  pivot means for pivotably mounting the truss supported conduit span to the water delivery pipe,
  travel means for ground supporting and moving the free swinging end of the truss supported conduit span,
  valve coupler rotation means for allowing rotation of the truss supported conduit span when the free swinging end is secured by the valve coupling means to an access valve,
  control means operative responsive to the valve coupling means and travel means for controlling the uncoupling, travel and recoupling of the valve coupling means along the series of access valves.

28. For use with a land irrigation system including a series of access valve spaced along a water main and a water delivery pipe mounted by carts for travel transverse to the delivery pipe length; an apparatus to successively forward an access valve coupler along the series of access valves in relation to travel of the water delivery pipe comprising:
  valve coupling means for selectively connecting the water delivery pipe to the individual access valves,
  swing arm means mounted to the water delivery pipe and extending therefrom to a free swinging end supporting the valve coupling means for guided transport of the valve coupling means between access valves and for flowing water between the valve coupling means and the delivery pipe,
  pivot means for pivotably mounting the swing arm means to the water delivery pipe,
  travel means for ground supporting and moving the free swinging end of the swing arm means,
  valve coupler rotation means for allowing rotation of the swing arm means when the free swinging end is secured by the valve coupling means to an access valve, control means operative responsive to the valve coupling means and travel means for controlling the uncoupling, travel, and recoupling of the valve coupling means along the series of access valves, valve actuator means which utilizes the available weight of the swing arm means and valve coupling means to downwardly force open a valve open.

* * * * *